US011159929B2

(12) United States Patent
Ye et al.

(10) Patent No.: US 11,159,929 B2
(45) Date of Patent: Oct. 26, 2021

(54) SCHEDULING REQUEST FOR FURTHER ENHANCED NARROWBAND INTERNET OF THINGS (FENB-IOT)

(71) Applicant: Apple Inc., Cupertino, CA (US)

(72) Inventors: Qiaoyang Ye, Fremont, CA (US); Debdeep Chatterjee, San Jose, CA (US); Salvatore Talarico, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/479,188

(22) PCT Filed: Mar. 22, 2018

(86) PCT No.: PCT/US2018/023829
§ 371 (c)(1),
(2) Date: Jul. 18, 2019

(87) PCT Pub. No.: WO2018/175764
PCT Pub. Date: Sep. 27, 2018

(65) Prior Publication Data
US 2019/0387383 A1 Dec. 19, 2019

Related U.S. Application Data

(60) Provisional application No. 62/476,106, filed on Mar. 24, 2017, provisional application No. 62/502,515, (Continued)

(51) Int. Cl.
*H04W 4/80* (2018.01)
*H04W 8/24* (2009.01)
(Continued)

(52) U.S. Cl.
CPC ............... *H04W 4/80* (2018.02); *H04W 8/24* (2013.01); *H04W 28/0278* (2013.01); *H04W 72/1273* (2013.01); *H04W 74/0833* (2013.01)

(58) Field of Classification Search
CPC ..... H04W 4/80; H04W 8/24; H04W 28/0278; H04W 72/1273; H04W 74/0833; H04W 4/70; H04L 1/1671
See application file for complete search history.

(56) References Cited

U.S. PATENT DOCUMENTS

2016/0270038 A1* 9/2016 Papasakellariou .... H04L 1/1671
2018/0152961 A1* 5/2018 Yamazaki ......... H04W 72/1284

FOREIGN PATENT DOCUMENTS

WO 2016/108548 A1 7/2016
WO 2016/144140 A1 9/2016
(Continued)

OTHER PUBLICATIONS

3GPP TSG RAN WG2 #92 (Year: 2015).*
(Continued)

*Primary Examiner* — Dady Chery
(74) *Attorney, Agent, or Firm* — Sterne, Kessler, Goldstein & Fox P.L.L.C.

(57) ABSTRACT

An apparatus to be used in a user equipment (UE) in a further enhanced narrowband Internet of Things (feNB-IoT) network to communicate with a base station, may include transceiver circuitry and processing circuitry, coupled to the transceiver circuitry. The processing circuitry may process scheduling request (SR) configuration information received from the base station; and encode one or more SRs for transmission based on the SR configuration information.

25 Claims, 11 Drawing Sheets

Related U.S. Application Data filed on May 5, 2017, provisional application No. 62/543,074, filed on Aug. 9, 2017.

(51) Int. Cl.
　　*H04W 28/02*　　(2009.01)
　　*H04W 72/12*　　(2009.01)
　　*H04W 74/08*　　(2009.01)

(56) References Cited

FOREIGN PATENT DOCUMENTS

| | | |
|---|---|---|
| WO | 2016/153548 A1 | 9/2016 |
| WO | 2017/014715 A1 | 1/2017 |

OTHER PUBLICATIONS

3GPP TSG RAN WG2 Meeting #97 bis (Year: 2017).*
International Patent Office—International Search Report and Written Opinion dated May 23, 2018, from International Application No. PCT/US2018/023829, 14 pages.

* cited by examiner

SCHEDULING REQUEST FOR FURTHER ENHANCED NARROWBAND INTERNET OF THINGS (FENB-IOT)

RELATED APPLICATIONS

This application is a national phase entry under 35 U.S.C. § 371 of International Application No. PCT/US2018/023829, filed Mar. 22, 2018, entitled "DESIGN OF SCHEDULING REQUEST FOR FURTHER ENHANCED NARROWBAND INTERNET OF THINGS (FENB-IoT)," which claims benefit of U.S. Provisional Patent Application No. 62/476,106, filed on Mar. 24, 2017, U.S. Provisional Patent Application No. 62/502,515, filed on May 5, 2017, and U.S. Provisional Patent Application No. 62/543,074, filed on Aug. 9, 2017, each of which is hereby incorporated by reference herein in its entirety.

TECHNICAL FIELD

Various embodiments generally may relate to the field of wireless communications, and in particular to scheduling requests (SRs) for feNB-IoT

BACKGROUND

It is noted that in Rel-13 for Narrowband Internet of Things (NB-IoT), as well as in Rel-14 of eNB-IoT, there is no dedicated scheduling request (SR). Thus, under these standards SR functionality may be realized by either connected mode RACH, or by releasing and re-establishing a connection via regular random access. The lack of provision for such a dedicated SR was motivated by the fact that NB-IoT User Equipments (UEs) are typically expected to only stay in connected mode for very short durations of time, due to very infrequent traffic patterns. It is further noted that Channel Status Information (CSI) feedback is also not supported in Rel-13 or Rel-14. The only supported Uplink Control Information (UCI) is Hybrid Automatic Repeat Request Acknowledgement (HARQ-ACK) feedback in response to scheduled Narrowband Physical Downlink Shared Channel (NPDSCH), and moreover, HARQ-ACK feedback piggybacked with Narrowband Physical Uplink Shared Channel NPUSCH (with data) is also not supported.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
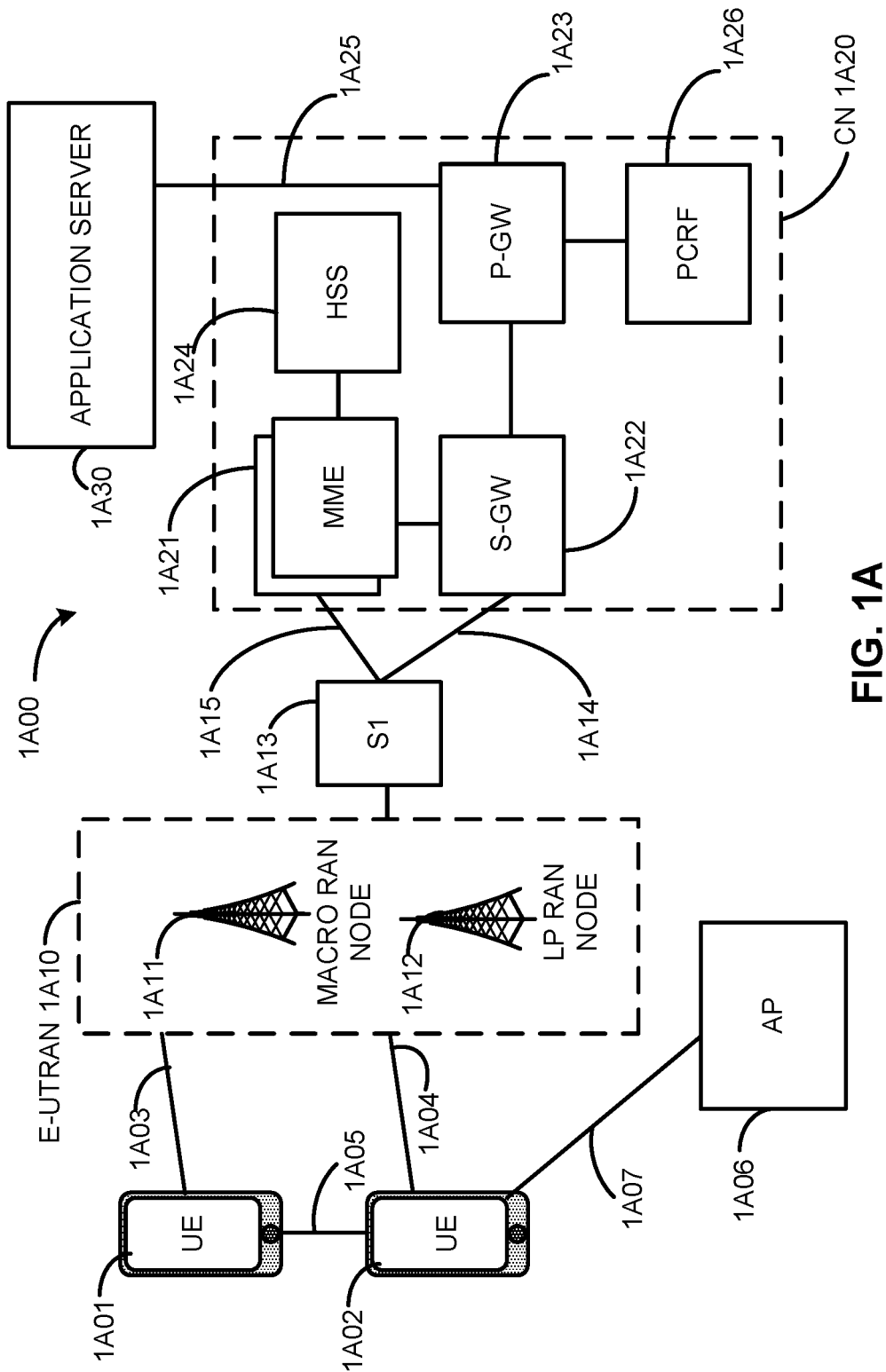
FIG. 1A illustrates an architecture of a system 1A00 of a network in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

For simplicity, the following abbreviations are used in this disclosure:

MTC Machine Type Communication
BPSK Binary Phase Shift Keying
BR Bandwidth Reduced
BSR Buffer Status Report
BL BR Low Complexity
BW Bandwidth
CE Coverage Enhancement
CoMP Coordinated Multi Point
CRC Cyclic Redundancy Check
C-RNTI Cell Radio Network Temporary Identifier
CS Cyclic Shift
DCI Downlink Control Information
DMRS Demodulation Reference Signal
eNB Evolved Node B
HARQ-ACK Hybrid Automatic Repeat Request Acknowledgement
NB-IoT Narrowband Internet of Things
NB-SIB Narrowband System Information Block
NPDCCH Narrowband Physical Downlink Control Channel
NPRACH Narrowband Physical Random Access Channel
NPDSCH Narrowband Physical Downlink Shared Channel
NPUSCH Narrowband Physical Uplink Shared Channel
OCC Orthogonal Cover Code
PRB Physical Resource Block
QPSK Quadrature Phase Shift Keying
RACH Random Access Channel
RL Repetition Level
RU Resource Unit
RRC Radio Resource Control
SC Sub-carrier
SIB System Information Block SR Search Request
TBS Transport Block Size
UCI Uplink Control Information
UE User Equipment
UL Uplink In embodiments, apparatus and methods for implementing scheduling requests for NB-IoT systems may be provided.

In embodiments, an apparatus to be used in a user equipment (UE) in a further enhanced narrowband Internet of Things (feNB-IoT) network to communicate with a base station, may include transceiver circuitry and processing circuitry, coupled to the transceiver circuitry. The processing circuitry may process scheduling request (SR) configuration information received from the base station, and encode one or more SRs for transmission based on the SR configuration information.

In what follows, various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," and "A/B" mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, including in the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As used herein, including the claims, a NB-IoT carrier is referred to as an "anchor carrier" if it carries Narrowband Primary and Secondary Synchronization Signals (NPSS/NSSS), Narrowband Physical Broadcast Channel (NPBCH), Narrowband System Information Block Type 1 (SIB1-NB), and other Narrowband System Information (SI) messages (NB-SI). Also the anchor carrier is the carrier that a UE camps on during idle mode. Otherwise, as used herein, a carrier is referred to as a "non-anchor carrier."

FIG. 1A illustrates an architecture of a system 1A00 of a network in accordance with some embodiments. The system 1A00 is shown to include a user equipment (UE) 1A01 and a UE 1A02. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 1A01 and 1A02 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 1A01 and 1A02 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1A01 and 1A02 may be configured to connect, e.g., communicatively couple, with a radio access network (RAN) 1A10—the RAN 1A10 may be, for example, an Evolved Universal Mobile Telecommunications System (UMTS) Terrestrial Radio Access Network (E-UTRAN), a NextGen RAN (NG RAN), or some other type of RAN. The UEs 1A01 and 1A02 utilize connections (or channels) 1A03 and 1A04, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 1A03 and 1A04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1A01 and 1A02 may further directly exchange communication data via a ProSe interface 1A05. The ProSe interface 1A05 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 1A05 may be used in vehicular applications and communications technologies, which are often referred to as V2X systems. V2X is a mode of communication where UEs (for example, UEs 1A01, 1A02) communicate with each other directly over the PC5/SL interface 105 and can take place when the UEs 1A01, 1A02 are served by RAN nodes 1A11, 1A12 or when one or more UEs are outside a coverage area of the RAN 1A10. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 1A01, 1A02, RAN nodes 1A11, 1A12, application servers 1A30, and pedestrian UEs 1A01, 1A02 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 1A01, 1A02 may be implemented/employed as Vehicle Embedded Communications Systems (VECS) or vUEs.

The UE 1A02 is shown to be configured to access an access point (AP) 1A06 (also referred to as also referred to as "WLAN node 1A06", "WLAN 1A06", "WLAN Termination 1A06" or "WT 1A06" or the like) via connection 1A07. The connection 1A07 can comprise a local wireless connection, such as a connection consistent with any IEEE 802.11 protocol, wherein the AP 1A06 would comprise a wireless fidelity (WiFi®) router. In this example, the AP 1A06 is shown to be connected to the Internet without connecting to the core network of the wireless system (described in further detail below). In various embodiments, the UE 1A02, RAN 1A10, and AP 1A06 may be configured to utilize LTE-WLAN aggregation (LWA) operation and/or WLAN LTE/WLAN Radio Level Integration with IPsec Tunnel (LWIP) operation. The LWA operation may involve the UE 1A02 in RRC_CONNECTED being configured by a RAN node 1A11, 1A12 to utilize radio resources of LTE and WLAN. LWIP operation may involve the UE 1A02 using WLAN radio resources (e.g., connection 1A07) via Internet Protocol Security (IPsec) protocol tunneling to authenticate and encrypt packets (e.g., internet protocol (IP) packets) sent over the connection 1A07. IPsec tunneling may include encapsulating entirety of original IP packets and adding a new packet header thereby protecting the original header of the IP packets.

The RAN 1A10 can include one or more access nodes that enable the connections 1A03 and 1A04. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 1A10 may include one or more RAN nodes for providing macrocells, e.g., macro RAN node 1A11, and one or more RAN nodes for providing femtocells or picocells (e.g., cells having smaller coverage areas, smaller user capacity, or higher bandwidth compared to macrocells), e.g., low power (LP) RAN node 1A12.

Any of the RAN nodes 1A11 and 1A12 can terminate the air interface protocol and can be the first point of contact for the UEs 1A01 and 1A02. In some embodiments, any of the RAN nodes 1A11 and 1A12 can fulfill various logical functions for the RAN 1A10 including, but not limited to, radio network controller (RNC) functions such as radio bearer management, uplink and downlink dynamic radio resource management and data packet scheduling, and mobility management.

In accordance with some embodiments, the UEs 1A01 and 1A02 can be configured to communicate using Orthogonal Frequency-Division Multiplexing (OFDM) communication signals with each other or with any of the RAN nodes 1A11 and 1A12 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1A11 and 1A12 to the UEs 1A01 and 1A02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1A01 and 1A02. The physical downlink control channel (PDCCH) may carry information about the transport format and resource allocations related to the PDSCH channel, among other things. It may also inform the UEs 1A01 and 1A02 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1A11 and 1A12 based on channel quality information fed back from any of the UEs 1A01 and 1A02. The downlink resource assignment information may be sent on the PDCCH used for (e.g., assigned to) each of the UEs 1A01 and 1A02.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1A10 is shown to be communicatively coupled to a core network (CN) 1A20—via an S1 interface 1A13. In embodiments, the CN 1A20 may be an evolved packet core (EPC) network, a NextGen Packet Core (NPC) network, or some other type of CN. In this embodiment the S1 interface 1A13 is split into two parts: the S1-U interface 1A14, which carries traffic data between the RAN nodes 1A11 and 1A12 and the serving gateway (S-GW) 1A22, and the S1 mobility management entity (MME) interface 1A15, which is a signaling interface between the RAN nodes 1A11 and 1A12 and MMEs 1A21.

In this embodiment, the CN 1A20 comprises the MMEs 1A21, the S-GW 1A22, the Packet Data Network (PDN) Gateway (P-GW) 1A23, and a home subscriber server (HSS) 1A24. The MMEs 1A21 may be similar in function to the control plane of legacy Serving General Packet Radio Service (GPRS) Support Nodes (SGSN). The MMEs 1A21 may manage mobility aspects in access such as gateway selection and tracking area list management. The HSS 1A24 may comprise a database for network users, including subscription-related information to support the network entities' handling of communication sessions. The CN 1A20 may comprise one or several HSSs 1A24, depending on the number of mobile subscribers, on the capacity of the equipment, on the organization of the network, etc. For example, the HSS 1A24 can provide support for routing/roaming, authentication, authorization, naming/addressing resolution, location dependencies, etc.

The S-GW 1A22 may terminate the S1 interface 1A13 towards the RAN 1A10, and routes data packets between the RAN 1A10 and the CN 1A20. In addition, the S-GW 1A22 may be a local mobility anchor point for inter-RAN node handovers and also may provide an anchor for inter-3GPP mobility. Other responsibilities may include lawful intercept, charging, and some policy enforcement.

The P-GW 1A23 may terminate an SGi interface toward a PDN. The P-GW 1A23 may route data packets between the EPC network 1A23 and external networks such as a network including the application server 1A30 (alternatively referred to as application function (AF)) via an Internet Protocol (IP) interface 1A25. Generally, the application server 1A30 may be an element offering applications that use IP bearer resources with the core network (e.g., UMTS Packet Services (PS) domain, LTE PS data services, etc.). In this embodiment, the P-GW 1A23 is shown to be communicatively coupled to an application server 1A30 via an IP communications interface 1A25. The application server 1A30 can also be configured to support one or more communication services (e.g., Voice-over-Internet Protocol (VoIP) sessions, PTT sessions, group communication sessions, social networking services, etc.) for the UEs 1A01 and 1A02 via the CN 1A20.

The P-GW 1A23 may further be a node for policy enforcement and charging data collection. Policy and Charging Enforcement Function (PCRF) 1A26 is the policy and charging control element of the CN 1A20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1A26 may be communicatively coupled to the application server 1A30 via the P-GW 1A23. The application server 1A30 may signal the PCRF 1A26 to indicate a new service flow and select the appropriate Quality of Service (QoS) and charging parameters. The PCRF 1A26 may provision this rule into a Policy and Charging Enforcement Function (PCEF) (not shown) with the appropriate traffic flow template (TFT) and QoS class of identifier (QCI), which commences the QoS and charging as specified by the application server 1A30.

Figure 1B:
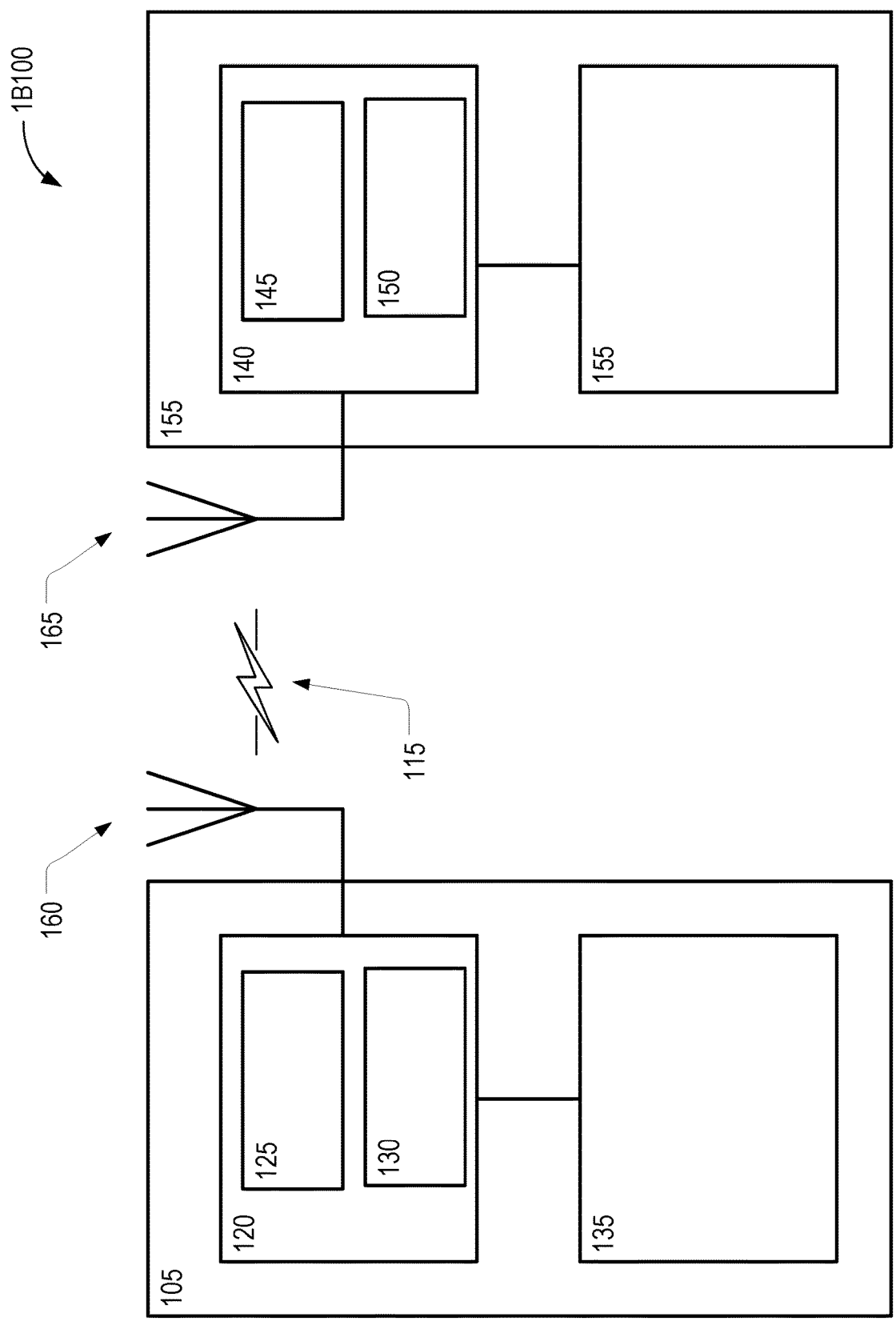
FIG. 1B illustrates an example network that includes a user equipment (UE) and an evolved NodeB (eNB), in accordance with various embodiments.

FIG. 1B illustrates an example network 1B100 that includes user equipment (UE) 105 and an evolved NodeB (eNB) 110, in accordance with various embodiments. In embodiments, the network 100 may be a third generation partnership project (3GPP) Long Term Evolution (LTE), LTE Advanced (LTE-A) LTE-Unlicensed (LTE-U), fifth generation (5G) network, and/or a new radio (NR) network. In other embodiments, the network 100 may be some other type of wireless communication network.

UE 105 may correspond to, and be generally interchangeable with, UE 1A01 or 1A02, while eNB 110 may correspond to, and be generally interchangeable with RAN node 1A11 or 1A12.

As shown in FIG. 1B, the UE 105 may include transceiver circuitry 120, which may also be referred to as a multi-mode transceiver chip. The transceiver circuitry 120 may be configured to transmit and receive signals using one or more protocols such as LTE, LTE-A, LTE-U, 5G, and/or NR protocols. Specifically, the transceiver circuitry 120 may be coupled with one or more of a plurality of antennas 160 of the UE 105 for communicating wirelessly with other components of the network 100, e.g., eNB 110 over radio link 115. The antennas 160 may be powered by the transceiver circuitry 120, for example, by a power amplifier, which may be a component of the transceiver circuitry 120 as shown in FIG. 1B, or separate from but coupled with the transceiver circuitry 120. In one embodiment, the power amplifier may provide the power for all transmissions on the antennas 160. In other embodiments, there may be multiple power amplifiers on the UE 105. The use of multiple antennas 160 may allow for the UE 105 to use transmit diversity techniques such as spatial orthogonal resource transmit diversity (SORTD), multiple-input multiple-output (MIMO), or full-dimension MIMO (FD-MIMO).

In certain embodiments the transceiver circuitry 120 may include transmit circuitry 125 configured to cause the antennas 160 to transmit one or more signals from the UE 105, and receive circuitry 130 configured to process signals received by the antennas 160. In some embodiments, the transmit circuitry 125 and the receive circuitry 130 may be implemented as a single communication circuitry. In other embodiments, the transmit circuitry 125 and the receive circuitry 130 may be implemented in separate chips or modules, for example, one chip including the receive circuitry 130 and another chip including the transmit circuitry 125. In some embodiments, the transmitted or received signals may be cellular signals transmitted to or received from eNB 110 or network 100. In embodiments, processing circuitry 135 may process SR configuration information and/or parameters received by transceiver circuitry 120, and may implement the SR configuration, based, at least in part, on information and/or parameters in the configuration information. In some embodiments, the processing circuitry may process scheduling request (SR) configuration information received from the base station, and may encode one or more SRs for transmission based on the SR configuration information. In some embodiments, the processing circuitry may encode a SR capability signal for transmission to the base station.

In some embodiments, the transceiver circuitry 120 and the processing circuitry 135 may be provided in a single chip or apparatus within UE 105.

Similar to UE 105, eNB 110 may include transceiver circuitry 140. The transceiver circuitry 140 may be further coupled with one or more of a plurality of antennas 165 of the eNB 110 for communicating wirelessly with other components of the network 100, e.g., UE 105 over radio link 115. The antennas 165 may be powered by a power amplifier, or may be a separate component of the eNB 110. In one embodiment, the power amplifier may provide the power for all transmissions on the antennas 165. In other embodiments, there may be multiple power amplifiers on the eNB 110. The use of multiple antennas 165 may allow for the eNB 110 to use transmit diversity techniques such as SORTD, MIMO, or FD-MIMO. In certain embodiments the transceiver circuitry 140 may contain both transmit circuitry 145 configured to cause the antennas 165 to transmit one or more signals from the eNB 110, and receive circuitry 150 to process signals received by the antennas 165. In other embodiments, the transceiver circuitry 140 may be replaced by transmit circuitry 145 and receive circuitry 150 which are separate from one another (not shown). In some embodiments, the eNB 110 may include configuration circuitry 155, to process SR capability signals received by transceiver circuitry 140 from a UE (in embodiments where a UE sends SR capability signals, as described below), and to generate SR configuration information and/or parameters for the UE, and other UEs, to be sent to the UE(s) by transceiver circuitry 140.

In some embodiments, the electronic device of FIG. 1 may be configured to perform one or more processes, techniques, and/or methods as described herein, or portions thereof.

Figure 2:
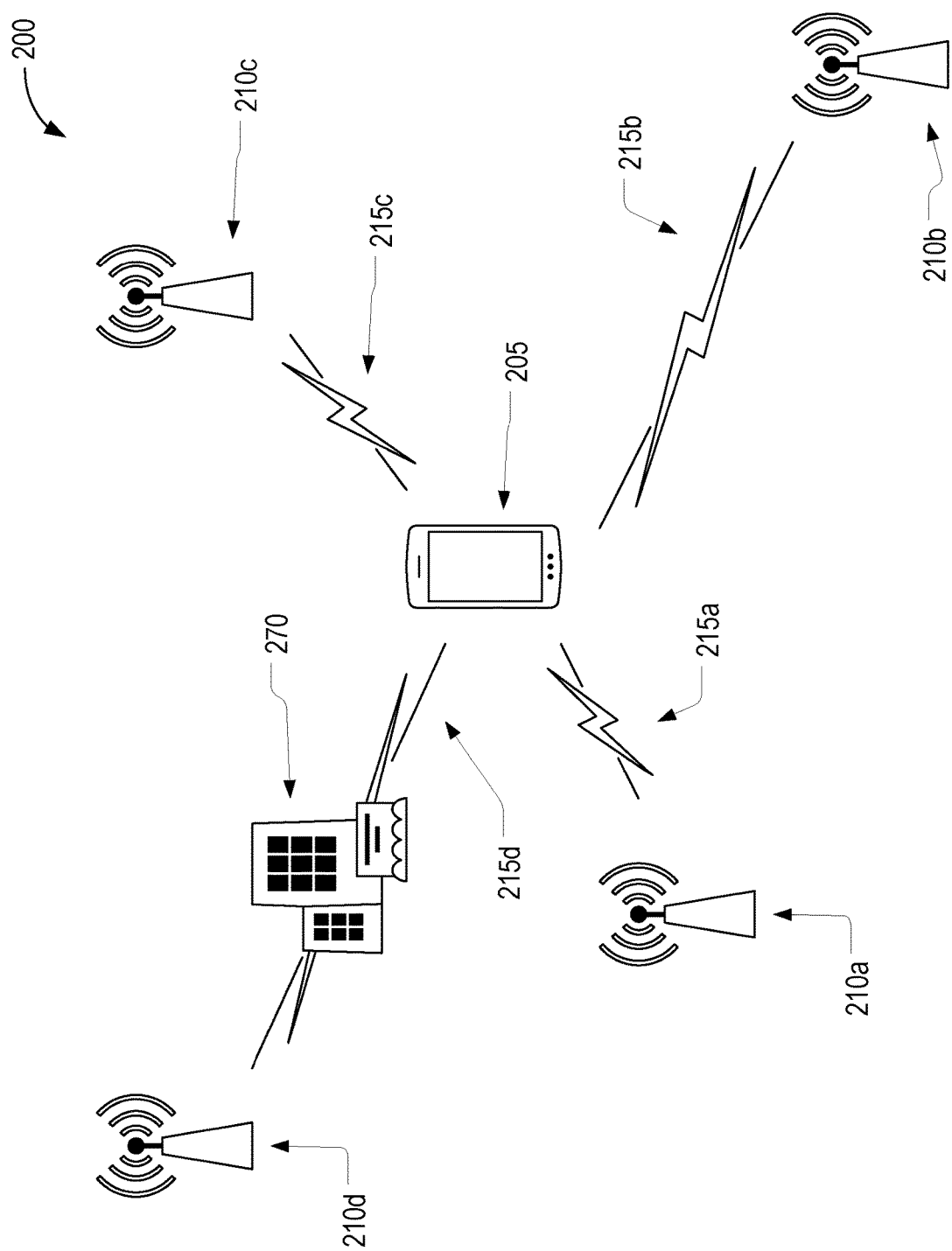
FIG. 2 illustrates an example network that includes a plurality of eNBs, in accordance with various embodiments.

FIG. 2 illustrates an example network 200 that includes a plurality of eNBs, in accordance with various embodiments. For example, the network 200 may include a plurality of eNBs such as eNBs 210a, 210b, 210c, and 210d. In embodiments, respective eNBs 210a-d may be similar to eNB 110. The network 200 may also include a UE 205, which may be similar to UE 105. In embodiments, the UE 105 may be able to communicate with the eNBs 210a-d over radio links 215a, 215b, 215c, 215d, which may be similar to radio link 115. It will be understood that although network 200 is shown to have four eNBs, in embodiments network 200 may have greater or fewer eNBs.

As noted above, in Rel-13 NB-IoT, as well as in Rel-14 eNB-IoT, no dedicated scheduling request (SR) is provided for. Thus, SR functionality may be realized by connected mode RACH, or, for example, by releasing and re-establishing a connection via regular random access. Further, CSI feedback is not supported either. While the only supported UCI is HARQ-ACK feedback in response to scheduled NPDSCH, HARQ-ACK feedback piggybacked with NPUSCH (with data) is not supported.

For ease of understanding the description of NPUSCH format 2 related embodiments, a brief summary of the key designs of NPUSCH format 2 in Rel-13 NB-IoT is next provided.

In Rel-13 NB-IoT, NPUSCH format 2 is designed to carry 1-bit HARQ-ACK feedback. Repetition coding is used for NPUSCH format 2, without CRC. Only single-tone NPUSCH is supported for HARQ-ACK feedback. There are two kinds of numerology supported for NPUSCH format 2, 15 kHz and 3.75 kHz subcarrier (SC) spacing. For modulation, only pi/2-BPSK is supported. DMRS symbols for 3.75 kHz SC spacing for NPUSCH format 2 are contained in the first 3 NB-IoT symbols, and DMRS symbols for 15 kHz SC spacing for NPUSCH format 2 are contained in NB-IoT symbols 2, 3 and 4.

Additionally, frequency and time domain resources are indicated via DCI format N1 with respect to a reference frequency-time resource. Specifically, in the frequency domain, the reference subcarrier is fixed (subcarrier #0 for 15 kHz SC spacing, and subcarrier #45 for 3.75 kHz SC spacing). 2 bits and 3 bits in DCI format N1 are used to indicate the offset for 15 kHz and 3.75 kHz, respectively. In the time domain, the reference timing position is 12 ms following the end of a corresponding NPDSCH. 2 bits and 1 bit in DCI format N1 are used for indication of timing offset for 15 kHz and 3.75 kHz, respectively.

It is noted that in Rel-15 feNB-IoT, support of SR is included as one objective to further reduce latency for UEs with diverse traffic applications that may necessitate the UE to be in connected mode for relatively longer durations compared to the target use cases that were considered in Rel-13 and Rel-14.

In what follows, dedicated SR methods, techniques and designs for NB-IoT systems are described, in accordance with various embodiments. The disclosed methods, as well as their applicability, configuration, format, modulation, resource allocation, and multiplexing design, are next described.

In embodiments, a UE may signal its capability to support SR to a base station, such as an eNB. In embodiments, the eNB may configure the UE to enable SR using higher layer signaling, by either an explicit or an implicit indication. For example, an implicit indication may include the configuration of SR resources, and where there is no such configuration, it is understood that SR is disabled.

In some embodiments, SR may be supported only for UEs that have good signal coverage. For example, whether SR is enabled for a given UE may depend upon a NPRACH coverage level of the UE or NPDCCH repetitions (e.g., Rmax). It is noted that one example of a specified NPRACH level may be when the last successfully detected NPRACH is from a resource set with a number of NPRACH repetitions <X, X being predefined in a specification, or configured in a cell-specific manner by the eNB via NB-SIB signaling. Moreover, one example of NPDCCH repetitions may be if Rmax<=R, SR may be supported by the UE, say, for example, where R=32, otherwise, SR may not supported by the UE.

In embodiments, there may be two alternatives for sending dedicated SR. These are next described.

In a first alternative, a new NPUSCH/NPUCCH format may be defined. According to this first alternative, a defined sequence may be used for the SR. Thus, when a UE has a SR, it may transmit the sequence at a configured SR resource, and when the UE does not have a SR, it need not transmit the sequence.

In one embodiment, the sequence may be the Zadoff-Chu (ZC) sequence. It is here noted that in embodiments, a root index, cyclic shift, and/or OCC may be predefined or configured by higher layer signaling. It is also noted that in some examples, the root index, CS and/or OCC may be UE-specific, and some UEs may have the same time/frequency resources configured for SR. The SRs for these multiplexed UEs may still be orthogonal by configuring appropriate CS/OCC.

Alternatively, in other embodiments, the root index, CS and OCC may be cell-specific. In such cases, UE multiplexing in the same time/frequency domain SR resources may not be allowed. Thus, in such cell-specific the orthogonality between SRs from different UEs may be realized by allocating orthogonal time/frequency resources.

In embodiments, a sequence similar to the NPRACH sequence may be used. The sequence may, for example, be all 1's or different from all 1's (e.g., using a ZC or QPSK sequence) to reduce chances of false detection in multi-cell environments. In embodiments, multiplexing UEs may be realized by applying OCC on top of the sequence in the frequency and/or time domain. In other embodiments, UE multiplexing on the same PRBs may not be supported.

In embodiments, if single-tone transmission is used, the sequence length may, for example, be the same as the number of symbols used for SR transmission in a subframe or a 2 ms slot for 3.75 kHz subcarrier spacing. For example, the sequence length may be 14, mapped to the 14 symbols in a subframe. On the other hand, if multi-tone transmission is used, the sequence length may be the same as the number of tones used per symbol, and the sequence may be repeated over the symbols allocated for SR. Still alternatively, the sequence length may be the number of tones multiplied by the number of symbols allocated for SR. In such embodiments, mapping of the sequence may be either time-first or frequency-first. In other embodiments, the sequence length may be the same as the number of symbols that are allocated for SR. Additionally, the sequence may be repeated in the frequency domain to fit in the multi-tone transmission.

Turning now to a second alternative ("Alternative 2"), in embodiments, NPUSCH format 2 may be reused. In such embodiments, 1 informational bit may be used to indicate the existence of SR. In such embodiments, the DMRS may be the same as NPUSCH format 2, or, for example, may be the same as NPUSCH format 1. In some embodiments, multiplexing of UEs may be realized by applying OCC in the time domain. In embodiments, the orthogonal sequence may be the ZC sequence, a DFT orthogonal sequence or the Hadamard sequence. In other examples, UE multiplexing on the same resources may not supported. Still alternatively, frequency domain multiplexing may be used by allocating different subcarriers to different UEs. It is here noted that in order to differentiate from legacy NPUSCH format 2, the resources configured for SR may preferably be different than the resources allocated for HARQ-ACK transmission. When the configured SR resources collide with resources allocated for HARQ-ACK for the same UE, the SR piggybacked with HARQ-ACK can be used.

For embodiments with 1 bit SR information, the modulation may be on-off keying, BPSK, or pi/2-BPSK. For example, pi/2-BPSK may be used for single-tone SR transmission. If on-off keying modulation is used, it is noted that transmission may occur only when there is a SR to be transmitted, otherwise, no transmission occurs.

In embodiments, both single-tone as well as multi-tone transmissions may be supported for SR. In embodiments, for single-tone transmission, 3.75 kHz and/or 15 kHz subcarrier spacing may be used, and for multi-tone transmission, 15 kHz subcarrier spacing may be used. In some embodiments, only single-tone with 3.75 kHz may be supported for dedicated SR. In this case, HARQ with SR may be transmitted only when NPUSCH format 2 for HARQ-ACK feedback has a subcarrier spacing of 3.75 kHz. Thus, if it is configured to have a subcarrier spacing of 15 kHz, either the SR is dropped, or the UE may transmit HARQ-ACK using 3.75 kHz subcarrier spacing.

In embodiments, an SR time-domain resource may be fixed, or configured by higher layer signaling, by indicating periodicity, offset and/or repetitions. In embodiments, The periodicity/offset/repetitions may be in units of absolute time (e.g., 1 ms or RU), or only count valid UL (e.g. 1 UL subframe or RU UL subframes). The periodicity of SR may be set to larger than the number of repetitions of SR. In embodiments, the number of repetitions of the SR transmission may be configured via dedicated RRC signaling.

It is noted that, in embodiments, frequency domain resources for SR may be fixed, or, for example, configured by higher layer signaling. In embodiments, an indication may be similar to NPUSCH format 2 frequency domain resource indication, i.e., an offset with respect to a baseline subcarrier. Alternatively, for example, the indication may include an index of (starting) subcarrier and/or the number of subcarriers. In either case, if NPUSCH format 2 is used, the possible subcarriers for SR transmission may be such that they do not correspond to subcarriers 0, 1, 2, 3 in an NB-IoT UL carrier for 15 kHz subcarrier spacing, and do not correspond to subcarriers #0 to #1 and subcarriers #38 to #47 in an NB-IoT UL carrier for 3.75 kHz subcarrier spacing.

As noted above, in some embodiments, whether or not SR is supported may be a function of the NB-IoT UE having good signal coverage. Similarly, in some embodiments, different sets of resources may be configured for different coverage levels. In such embodiments, UEs may, for example, select the time/frequency resources based on the NPRACH coverage level. Alternatively, the resources may be directly indicated by an eNB. In embodiments, it may be up to the eNB implementation to configure SR resources after considering a UE's coverage level.

In embodiments, some of the SR configuration parameters may be cell-specific, while some may be UE-specific. For example, baseline frequency domain resources may be cell-specific and/or the root index of the sequence may be cell-specific (e.g., calculated by cell ID), while CS/OCC (if used) and/or periodicity, and offset for time/frequency domain resources may be UE-specific.

In some embodiments, the timer sr-ProhibitTimer value may be extended, considering the repetitions in NB-IoT systems. Thus, it is noted that in legacy LTE, the sr-ProhibitTimer is from {0, 1, . . . , 7}, where value x corresponds to duration of an x*SR period within which no SR retransmission is allowed. In embodiments, a larger value of x, or a re-interpretation of a prohibited duration for SR retransmission, considering the repetitions of UE coverage level or NPDCCH repetitions (e.g. Rmax), may be used.

In cases where the SR uses a part of NPRACH resources, such as, for example, reserved NPRACH resources, as long as the NPRACH starting subcarriers and number of subcarriers for NPRACH are integers of 12, SR without hopping may be FDMed with NPRACH. In some embodiments, SR may thus be based on NPUSCH format 2, with a subcarrier spacing of 3.75 kHz. In other embodiments, SR may be based on NPUSCH format 2, with a subcarrier spacing of 3.75 kHz or 15 kHz. With subcarrier spacing of 15 kHz, guard subcarriers may be used to avoid interference between SR and NPRACH. Similarly, in some embodiments, SR may not use the neighboring N subcarriers next to NPRACH, where N may be predefined or configured by RRC signaling.

As regards the relationship or interaction between SR and HARQ-ACK feedback (from the UE to an eNB), it is noted that in some embodiments SR and HARQ-ACK feedback may not be multiplexed. Thus, in such embodiments, when SR and HARQ-ACK feedback collide, either SR or HARQ-ACK may be dropped, such as, for example, SR may be dropped. Alternatively, in other embodiments, SR and HARQ-ACK feedback may be multiplexed.

In those embodiments where SR and HARQ-ACK feedback may be multiplexed, it is noted that one method to multiplex them may include to follow a similar method as in LTE, where HARQ-ACK is transmitted in the resource allocated for SR. In such embodiments, different frequency domain resources may preferably be allocated for HARQ-ACK and SR as described in some of the embodiments above. This technique may be applied, for example, in embodiments where SR and HARQ-ACK feedback may be multiplexed only when they collide. In other embodiments, for example as discussed below, where SR may be deferred to HARQ-ACK feedback if there is pending HARQ-ACK feedback, this method may not work unless the eNB reserves SR resources on the HARQ-ACK feedback subframe(s) as well.

In another embodiment, a sequence (e.g., the ZC sequence) may be multiplied by the HARQ-ACK modulated symbol when SR and HARQ-ACK are multiplexed. In such case, different sequences for HARQ-ACK with multiplexing of SR and HARQ-ACK without multiplexing of SR are needed. Specifically, it is noted, sequences with a repeated constant number for SR may not work. By using different sequences for HARQ-ACK with SR, false alarm probability may be increased compared to the case with only HARQ-ACK feedback.

In embodiments, any sequence with good correlation properties may be used, such as, for example, the ZC or Hadamard sequences. As one example of this embodiment, a length-2 Hadamard sequence may be applied to every 2 data symbols. Alternatively, a length-4 ZC/Hadamard sequence may be used, applying to the 4 data symbols per slot/NB-IoT slot (i.e. every 7 symbols). In yet another example, a length-8 ZC/Hadamard sequence may be applied to every 2 slots/NB-IoT slots.

In embodiments where the sequences are common across cells, e.g., a length-2 Hadamard sequence or a length-3 ZC sequence with cyclic extension to length of 4 is used, one sequence for HARQ-ACK with SR and one sequence for HARQ-ACK without SR may be predefined. Then the UE may, for example, select which one to use depending on the transmission of SR.

In embodiments where there are multiple sets of two orthogonal sequences, e.g., length-4 Hadamard sequence or length-8 ZC/Hadamard sequence, the set of sequences may be divided into multiple sets where each set includes a pair of sequences, for example, one set with [1 1 1 1] and [1, −1, 1, −1], while the other set with [1, −1, −1, 1] and [1, 1, −1, −1]. The two sequences in each set correspond to HARQ-ACK with SR and HARQ-ACK without SR, respectively. Which set to be used may be pseudo-randomly selected based on cell ID, and/or slot/subframe index. Thus, the set index may be determined by $$(\Sigma_{i=0}^{7} c(8n_s+i)2^i) \bmod K,$$

where K the number of sets with the predefined orthogonal sequences. For example, K=2 when length-4 Hadamard sequences are used, and K=4 when length-8 Hadamard sequences are used. Alternatively, the sequence may be configured by higher layer signaling, which may, in embodiments, be either cell-specific or UE-specific. As another example, a mapping from the OCC may be applied to the DMRS to the sequence to be used for the data symbols, e.g. the set may be determined by (nocc mod K). Once UE selects the OCC for DMRS, the sequence to be applied to data symbols may be determined.

In another implementation, SR and HARQ-ACK may be multiplexed in certain cases, such as, for example, where there are no repetitions of HARQ-ACK. Otherwise, SR may be dropped.

In embodiments where SR may be multiplexed with HARQ-ACK feedback, the following SR transmission methods may be considered. SR and HARQ-ACK feedback are only to be multiplexed when they collide. As described above, in one implementation, SR and HARQ-ACK feedback may always be multiplexed when they collide. In other implementations, they may be multiplexed only when neither SR nor HARQ-ACK feedback is configured with repetitions. Alternatively, when there is pending NPDSCH to be received by UE (e.g. after reception of NPDCCH or SPS scheduled if SPS is supported), and/or HARQ-ACK feedback to be sent by the UE, in embodiments, the UE may wait for the following HARQ-ACK feedback transmission and append SR to the HARQ-ACK feedback.

It is here noted that in cases where the SR and HARQ-ACK feedback are multiplexed via higher order modulation (e.g., QPSK for 1 bit SR+1 bit HARQ-ACK feedback), the required SNR for a certain BLER would be 3 dB higher compared to case without multiplexing. In embodiments, to keep the same level of coverage, larger number of repetitions may be needed for HARQ-ACK feedback with SR. To support this, the following methods may be considered, next described.

In one implementation, the number of repetitions for HARQ-ACK feedback may be configured to be large enough, so as to cause the HARQ-ACK feedback with SR achieve a target MCL. However, this may result in larger UE power consumption in cases where HARQ-ACK feedback without SR is transmitted, as the number of repetitions is more than needed.

Alternatively, two sets of number of repetitions may be configured by higher layer signaling, one for HARQ-ACK with SR and the other for HARQ-ACK without SR. In this example implementation, the UE may select the number of repetitions depending on whether SR is multiplexed with HARQ-ACK feedback. By setting a smaller (but still sufficient) number of repetitions for HARQ-ACK without SR, UE power consumption may be reduced. In embodiments, the eNB may perform hypothesis testing to determine the number of repetitions, and whether HARQ-ACK is multiplexed with SR.

In yet another implementation, the HARQ-ACK with SR may be supported only for non-power-limited UEs. For example, where the UEs have good signal coverage such that HARQ-ACK with SR using a higher modulation order may still achieve the same coverage. For example, this may be supported for UEs with available power headroom, such that larger power may be used for transmission of HARQ-ACK with SR using higher modulation order to achieve the same coverage.

In embodiments, to further reduce latency, BSR may be transmitted after SR, without a UL grant for BSR. Alternatively, in other embodiments, BSR may be transmitted without SR.

It is here noted that BSR is an indication regarding how large the UL packet is to be sent. In other words, it is a MAC layer message from a UE to an eNB to indicate that the UE has something to send, and requests a UL grant from the eNB to send this data. In embodiments, there may be two formats for BSR, a short format with a total of 8 bits (e.g., Logical Channel Group ID of 2 bits and buffer size of 6 bits), and a long format with a total of 24 bits (e.g., 4 buffer sizes, each of 6 bits). Alternatively, larger granularity may be considered for BSR, and thus the number of bits needed for BSR may be further reduced. This may be especially useful for the support of those embodiments described above in which BSR may be transmitted without SR transmission, wherein, for example, 2 bits may be transmitted to indicate a very coarse granularity for the UE's UL buffer status using NPUSCH format 2, but with the use of pi/4-QPSK modulation instead of pi/2-BPSK as defined for NPUSCH format 2 in NB-IoT.

It is noted that, in embodiments, by detecting a SR on certain resources, an eNB may determine which UE is sending it the SR. Thus, the BSR may still be scrambled by C-RNTI. In one implementation, a BSR may be transmitted in NPUSCH format 1.

As regards frequency domain resource use for BSR, these may be the same as those used as frequency resources for SR transmissions. In embodiments, the time domain resources for BSR may be the valid UL subframes following SR subframes. Alternatively, the BSR resources may be configured periodically, and BSR may be transmitted.

In embodiments, MCS may, for example, be predefined, configured by higher layer signaling, or follow the latest NPUSCH transmission. For example, pi/4 QPSK may be used for single-tone transmission while QPSK may be used for multi-tone transmission.

In embodiments, the number of repetitions used for BSR may, for example, be configured by higher layer signaling, be a function of NPRACH coverage level and/or NPDCCH repetitions (e.g. Rmax), follow the latest NPUSCH transmission, or be the same as the number of repetitions used to transmit Msg3.

In some embodiments, an SR sequence may be used for channel estimation for BSR demodulation. Thus, for example, if an eNB detects the SR but does not successfully decode BSR, the SR procedure may revert to a 4-step SR procedure, where a UL grant may be transmitted by the eNB to schedule the BSR in following steps.

Figure 3:
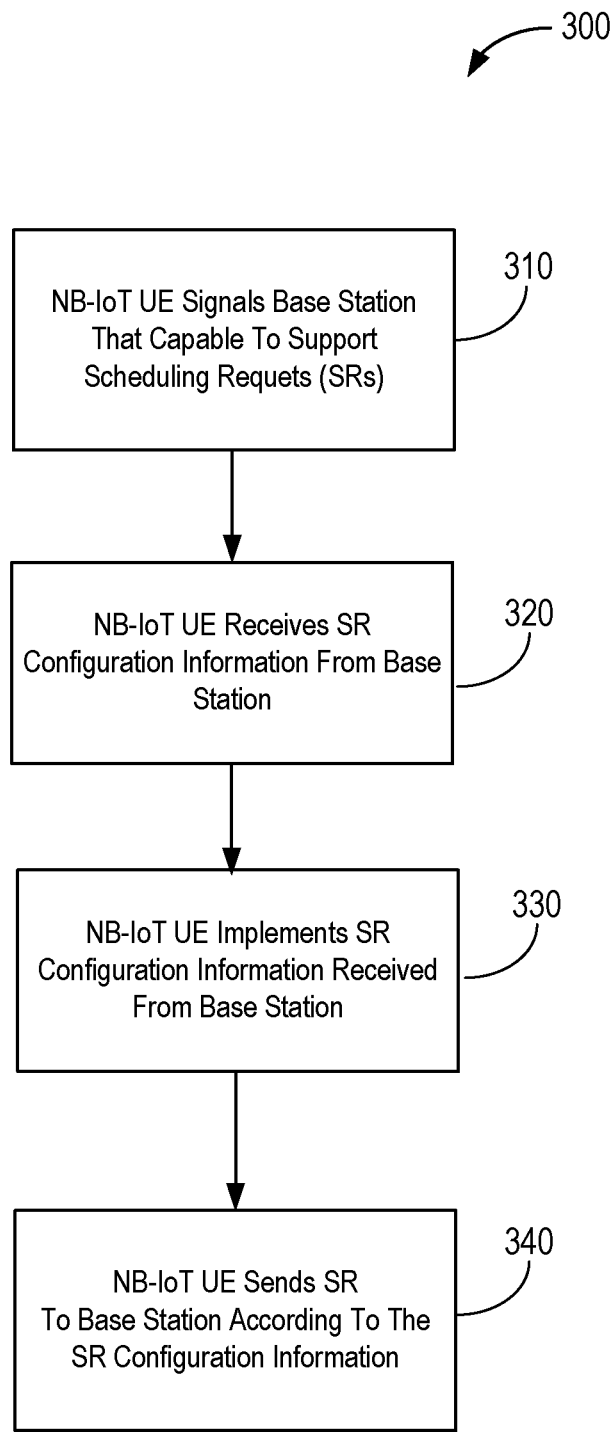
FIG. 3 illustrates an overview of the operational flow of a process for receiving SR configuration information and transmitting SR requests, in accordance with various embodiments.

FIG. 3 illustrates an overview of an operational flow of a process 300 for receiving SR configuration information and transmitting SR requests, in accordance with various embodiments.

As illustrated, process 300 may include operations performed at blocks 310-340. The operations may be performed, for example, by the various elements of apparatus 120 earlier described with reference to FIG. 1B. For example, in embodiments, the operations may be performed by transceiver circuitry 120 and processing circuitry 135. Process 300 may begin at block 310, where a NB-IoT UE signals to a base station (e.g., an eNB) that it is capable to support scheduling requests. From block 310, process 300 may move to block 320, where the NB-IoT UE may receive SR configuration information from the base station. The SR configuration information may include one or several parameters, including one or more options as described in detail above. From block 320, process 300 may move to block 330, where the NB-IoT UE may implement the SR configuration information received from the base station. As described in detail above, the configuration information may contain various parameters and conditions under which SR is supported on the UE, and how SR transmissions are to be performed. For example, FIG. 4, next described, illustrates an example NB-IoT UE where SR is only supported when the UE has good signal coverage.

From block 330, process 300 may move to block 340, where the NB-IoT UE sends an SR to the base station according to the SR configuration information. At block 340 process 300 may terminate.

It is noted that the embodiment of FIG. 3 assumes that a UE sends an explicit capability indication to a base station. While this is one option, in an alternate option, this may not be necessary. For example, it is possible that all Rel-15 (and later releases as well) feNB-IoT UEs would support SR and thus there may not be an explicit SR capability indication from a UE.

Figure 4:
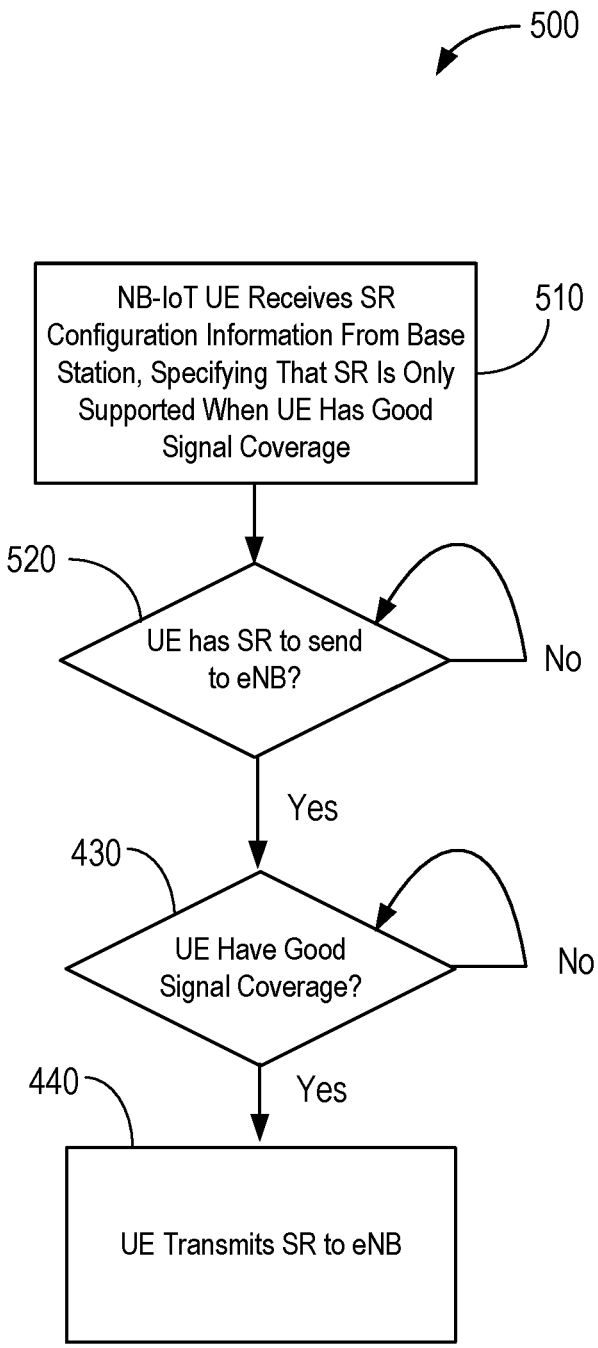
FIG. 4 illustrates an overview of the operational flow of a process for transmitting SR to an eNB only when the UE has good signal coverage, in accordance with various embodiments.

FIG. 4 illustrates an overview of the operational flow of a process 400 for transmitting, by a NB-IoT UE, SR to an eNB only when the UE has good signal coverage, in accordance with various embodiments.

As illustrated, process 400 may include operations performed at blocks 410-440. The operations may be performed e.g., by the various elements of apparatus 120 earlier described with reference to FIG. 1. Process 400 may begin at block 410, where the NB-IoT UE receives SR configuration information from a base station, specifying that SR is only supported on the UE when the UE has good signal coverage.

Continuing with reference to FIG. 4, from block 410, process 400 may move to query block 420, where it may be determined whether the UE has a SR to send to the eNB. If Yes, at 420 then process 400 may move to block 430, next described. However, if No at query block 420, then process 400 may return in a loop to block 420 until the UE does have a SR to send to the eNB.

Once the answer at query block 420 is Yes, process 400 may move to (second) query block 430, where it may be determined whether the UE is in good signal coverage, which is a condition of SR being supported, as per the SR configuration information received in block 410. If Yes, at 430 then process 400 may move to block 440, where the NB-IoT UE may transmit its SR to the eNB. At block 440 process 400 may terminate.

However, if the return was No at (second) query block 430, then process 400 may return in a loop to block 430 until the UE does have good signal coverage, and if and when it does, may proceed as described above.

It is here noted that in an alternate option (not shown in FIG. 4), instead of the base station, e.g., eNB, specifying when SR is supported, as shown at block 410, the eNB may simply disable SR for UEs that are in bad coverage. In this case, the eNB configuration of SR has already taken into account the UE's coverage, and in this alternate option it is not up to the UE to decide whether or not it is in sufficiently good signal coverage to support SR. The UE just follows the enabling/disabling of SR from eNB, while the condition to enable/disable SR is up to the eNB.

Figure 5A:
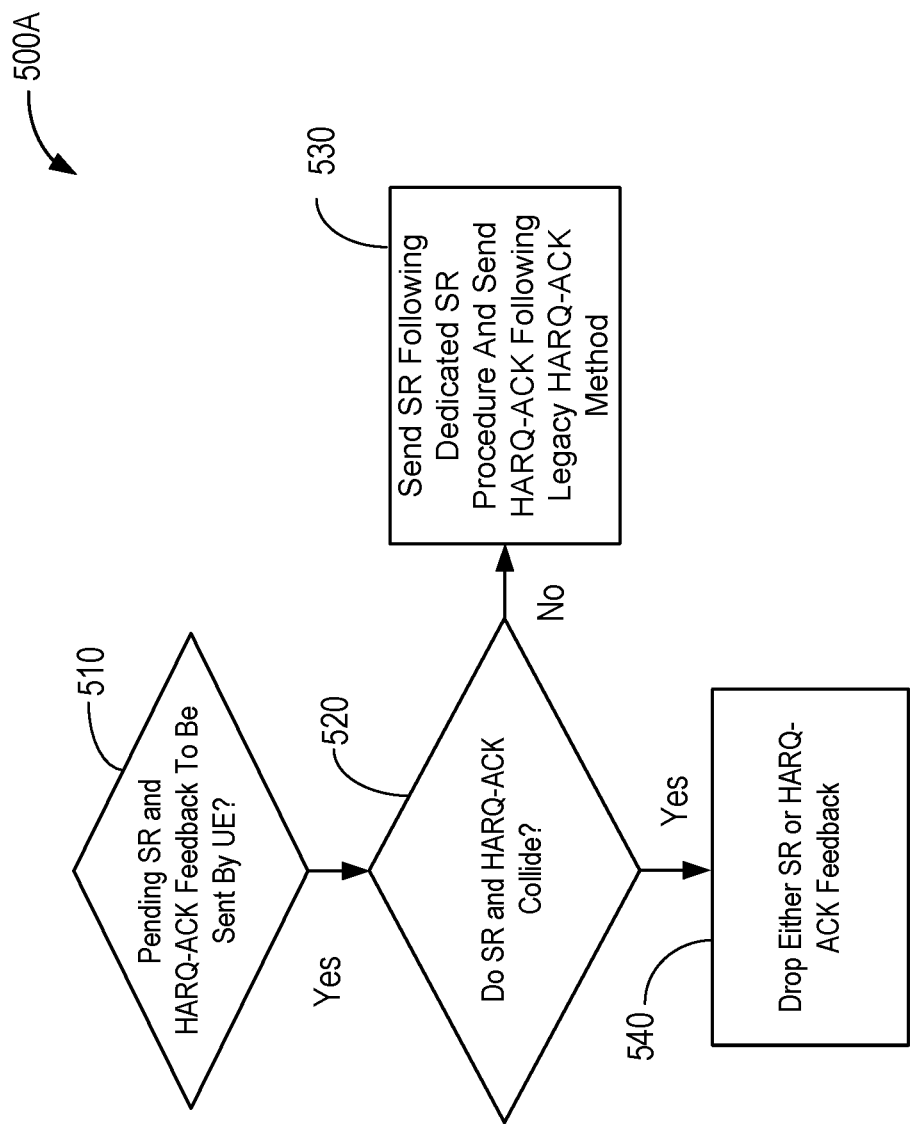
FIG. 5A illustrates an overview of the operational flow of a process for managing SR and HARQ-ACK feedback, in accordance with various embodiments.
Figure 5B:
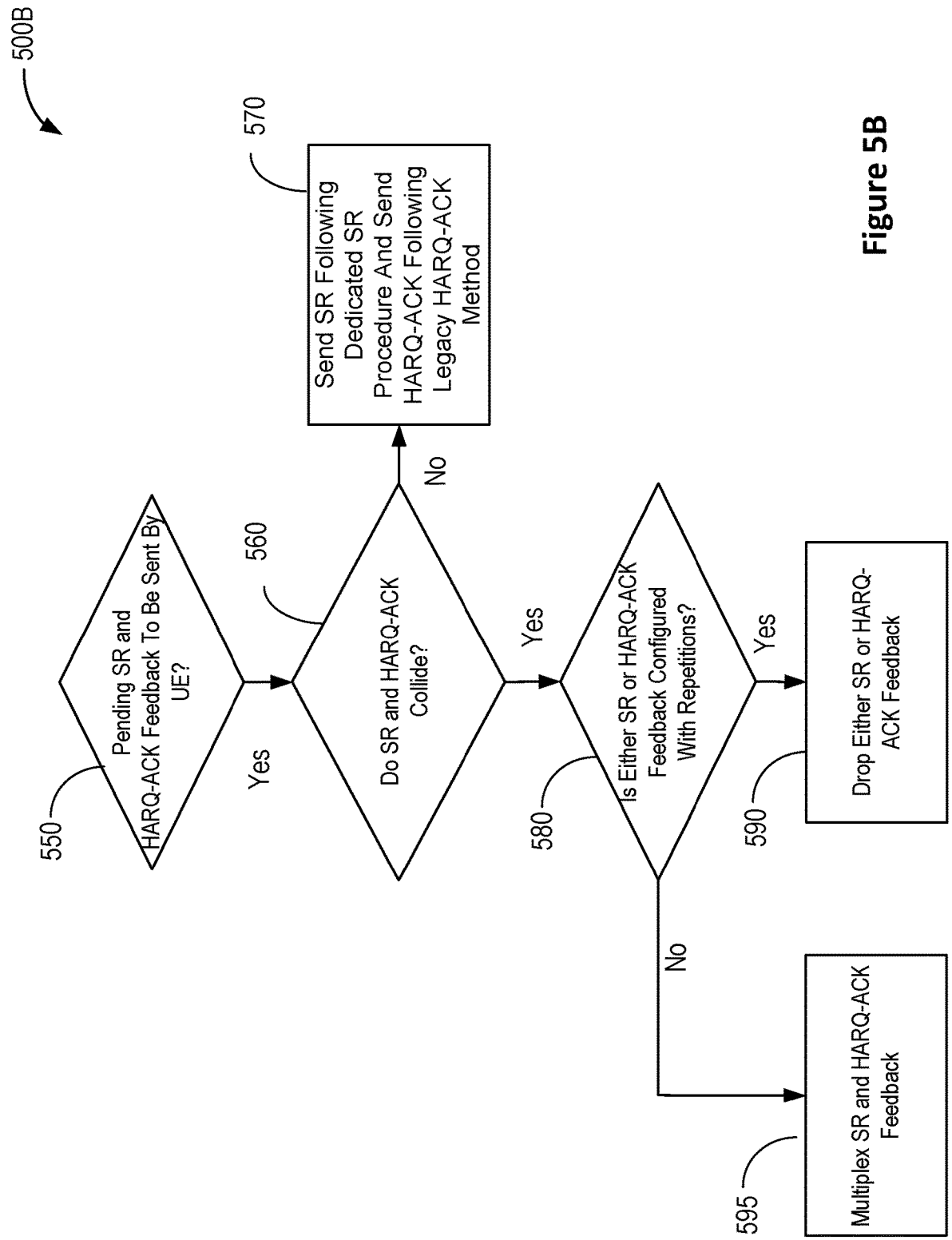
FIG. 5B illustrates an overview of the operational flow of an alternate process for managing SR and HARQ-ACK feedback, in accordance with various embodiments.

FIGS. 5A and 5B each illustrate an overview of the operational flow of a process for managing SR and HARQ-ACK feedback messages at an NB-IoT UE configured for SR transmissions, in accordance with various embodiments. FIG. 5A relates to those embodiments, as described above, where SR and HARQ-ACK may not be multiplexed. Alternatively, FIG. 5B relates to those embodiments, as described above, where SR and HARQ-ACK may be multiplexed, but only when both SR and HARQ-ACK have no repetitions.

Continuing with reference to FIG. 5A, as illustrated, process 500A may include operations performed at blocks 510-540. The operations may be performed e.g., by the various elements of apparatus 120 earlier described with reference to FIG. 1B. In alternate embodiments, process 500A may have more or less operations, and some of the operations may be performed in different order. Process 500A may begin at query block 510, where it may be determined if there is both a pending SR and a pending HARQ-ACK feedback response to be sent by the UE. If Yes at 510, then process 500A may move to query block 520, where it may be determined if SR and HARQ-ACK collide. If Yes at query block 520, then process 500A may move to block 540, where it may drop either SR or HARQ-ACK. Process 500A may then terminate. However, if No at query block 520, and the two signals do not collide, then process 500A may move to block 530, where it may send SR following a dedicated SR procedure and may send HARQ-ACK feedback following a legacy HARQ-ACK method, as they do not collide. Process 500A may then terminate.

In FIG. 5A it is noted that there is no "No" option at query block 510. This is because the "No" implies that the UE only has SR or HARQ-ACK feedback to send. In that case the UE would follow dedicated SR procedure, as described above, if it only has pending SR, or it would follow legacy HARQ-ACK feedback transmission if it only has pending HARQ-ACK. The same issue occurs in the case of FIG. 5B, next described.

Now referring to FIG. 5B, process 500B may include operations performed at blocks 550-595. It is here recalled that FIG. 5B addresses embodiments where SR and HARQ-ACK may be multiplexed, but only when both SR and HARQ-ACK have no repetitions.

The operations of process 5B may be performed e.g., by the various elements of apparatus 120 earlier described with reference to FIG. 1B. In alternate embodiments, process 500B may have more or less operations, and some of the operations may be performed in different order. Process 500B may begin at query block 550, where it may be determined if there is both a pending SR and a pending HARQ-ACK feedback response to be sent by the UE. If Yes at 550, then process 500B may move to query block 560, where it may be determined if the SR and HARQ-ACK collide. If No at 560, then process 500B may move to block 570, where it may send SR and HARQ-ACK without any issues, as they do not collide. Process 500B may then terminate.

If, however, at (second) query block 560 the return was "Yes", then process 500B may move to (third) query block 580, where it may be determined if either of the SR and the HARQ-ACK feedback are configured with repetitions. If "Yes" at (third) query block 580, then process 500B may move to block 590, where it may drop either SR or HARQ-ACK. Process 500B may then terminate. However, if "No" was returned at (third) query block 580, then process 500B may move to block 595, where it may multiplex HARQ-ACK feedback and SR. Process 500B may then terminate.

Figure 6:
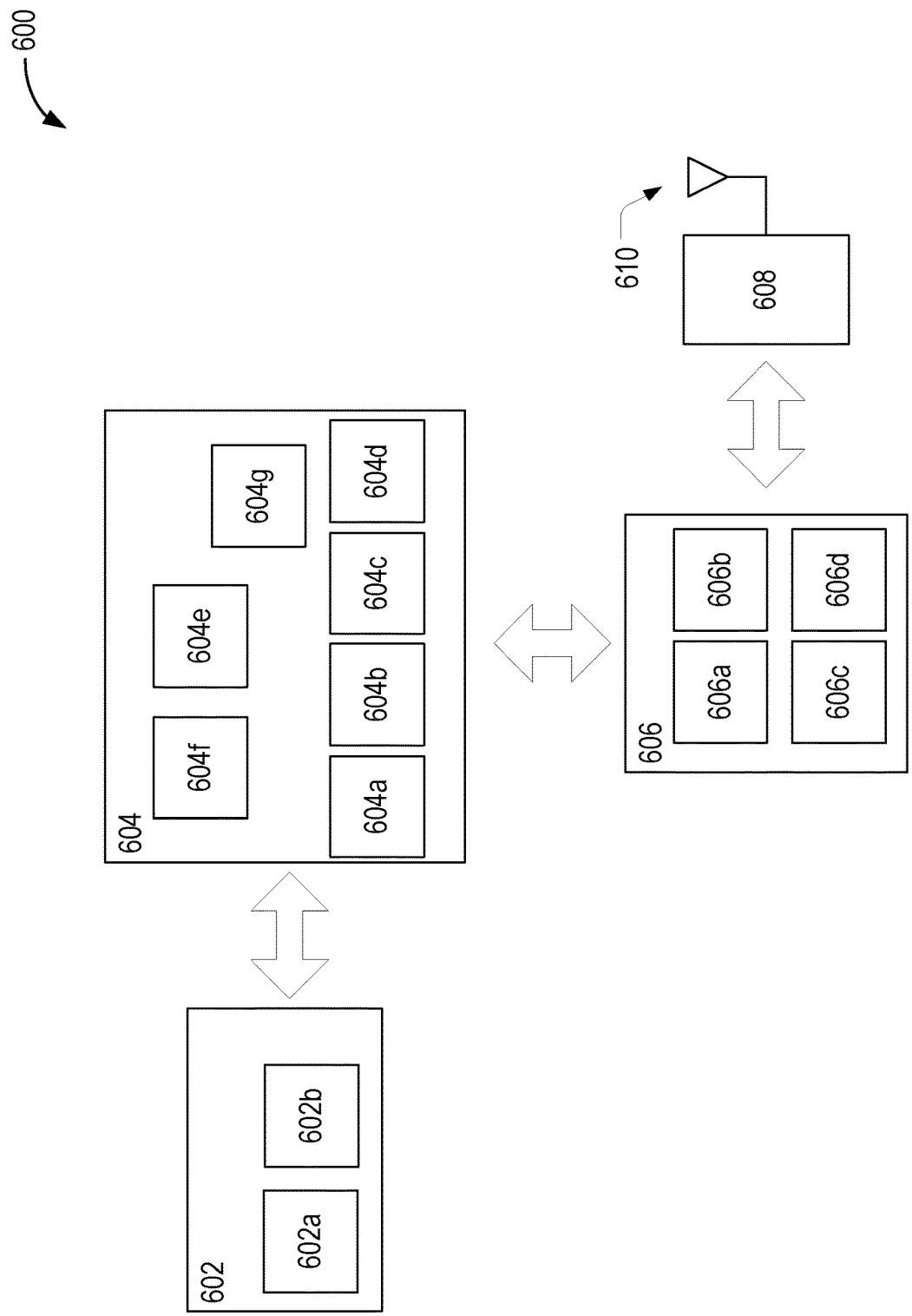
FIG. 6 illustrates an electronic device, in accordance with various embodiments.

Embodiments described herein may be implemented into a system using any suitably configured hardware and/or software. FIG. 6 illustrates, for one embodiment, example components of an electronic device 600. In embodiments, the electronic device 600 may be implemented, be incorporated into, or otherwise be a part of a user equipment (UE), an evolved NodeB (eNB), and/or some other electronic device. In some embodiments, the electronic device 600 may include application circuitry 602, baseband circuitry 604, Radio Frequency (RF) circuitry 606, front-end module (FEM) circuitry 608 and one or more antennas 610, coupled together at least as shown. In embodiments where the electronic device 600 is implemented in or by an eNB 210, the electronic device 600 may also include network interface circuitry (not shown) for communicating over a wired interface (for example, an X2 interface, an S1 interface, and the like).

The application circuitry 602 may include one or more application processors. For example, the application circuitry 602 may include circuitry such as, but not limited to, one or more single-core or multi-core processors 602a. The processor(s) 602a may include any combination of general-purpose processors and dedicated processors (e.g., graphics processors, application processors, etc.). The processors 602a may be coupled with and/or may include computer-readable media 602b (also referred to as "CRM 602b", "memory 602b", "storage 602b", or "memory/storage 602b") and may be configured to execute instructions stored in the CRM 602b to enable various applications and/or operating systems to run on the system. Application circuitry 602 may, in embodiments, may receive paging configuration messages from the network or the eNB, and may also make the choice as to which carrier to use for monitoring paging. Thus, in some embodiments, application circuitry 602 may include transceiver circuitry to receive paging configuration messages, and paging carrier selection circuitry, coupled to the transceiver circuitry, to process the paging configuration messages and select a paging carrier, based at least in part on the information contained in the paging configuration messages. In embodiments, paging carrier selection circuitry may process paging messages received by transceiver circuitry, and may select a carrier for monitoring paging from a set of available carriers based, at least in part, on information in the paging messages.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, and the like. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f The audio DSP(s) 604f may include elements for compression/decompression and echo cancellation and may include other suitable processing elements in other embodiments. The baseband circuitry 604 may further include computer-readable media 604b (also referred to as "CRM 604b", "memory 604b", "storage 604b", or "CRM 6042b"). The CRM 604g may be used to load and store data and/or instructions for operations performed by the processors of the baseband circuitry 604. CRM 604g for one embodiment may include any combination of suitable volatile memory and/or non-volatile memory. The CRM 604g may include any combination of various levels of memory/storage including, but not limited to, read-only memory (ROM) having embedded software instructions (e.g., firmware), random access memory (e.g., dynamic random access memory (DRAM)), cache, buffers, etc.). The CRM 604g may be shared among the various processors or dedicated to particular processors. CRM 604g may include one or more buffers, including uplink buffers.

Components of the baseband circuitry 604 may be suitably combined in a single chip, a single chipset, or disposed on a same circuit board in some embodiments. In some embodiments, some or all of the constituent components of the baseband circuitry 604 and the application circuitry 602 may be implemented together, such as, for example, on a system on a chip (SOC).

In some embodiments, the baseband circuitry 604 may provide for communication compatible with one or more radio technologies. For example, in some embodiments, the baseband circuitry 604 may support communication with an E-UTRAN and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc., to facilitate the communication with the wireless network. RF circuitry 606 may include a receive signal path that may include circuitry to down-convert RF signals received from the FEM circuitry 608 and provide baseband signals to the baseband circuitry 604. RF circuitry 606 may also include a transmit signal path that may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect, as other types of frequency synthesizers may be suitable. For example, synthesizer circuitry 606d may be a delta-sigma synthesizer, a frequency multiplier, or a synthesizer comprising a phase-locked loop with a frequency divider. The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602 depending on the desired output frequency. In some embodiments, a divider control input (e.g., N) may be determined from a look-up table based on a channel indicated by the application circuitry 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path that may include circuitry configured to operate on RF signals received from one or more antennas 610, amplify the received signals and provide the amplified versions of the received signals to the RF circuitry 606 for further processing. FEM circuitry 608 may also include a transmit signal path that may include circuitry configured to amplify signals for transmission provided by the RF circuitry 606 for transmission by one or more of the one or more antennas 610. In some embodiments, the FEM circuitry 608 may include a TX/RX switch to switch between transmit mode and receive mode operation. The FEM circuitry 608 may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the electronic device 600 may include additional elements such as, for example, a display, a camera, one or more sensors, and/or interface circuitry (for example, input/output (I/O) interfaces or buses) (not shown). In embodiments where the electronic device is implemented in or by an eNB, the electronic device 600 may include network interface circuitry. The network interface circuitry may be one or more computer hardware components that connect electronic device 600 to one or more network elements, such as one or more servers within a core network or one or more other eNBs via a wired connection. To this end, the network interface circuitry may include one or more dedicated processors and/or field programmable gate arrays (FPGAs) to communicate using one or more network communications protocols such as X2 application protocol (AP), S1 AP, Stream Control Transmission Protocol (SCTP), Ethernet, Point-to-Point (PPP), Fiber Distributed Data Interface (FDDI), and/or any other suitable network communications protocols.

In some embodiments, the electronic device of FIG. 6 may be configured to perform one or more processes, techniques, and/or methods as described herein, or portions thereof.

Figure 7:
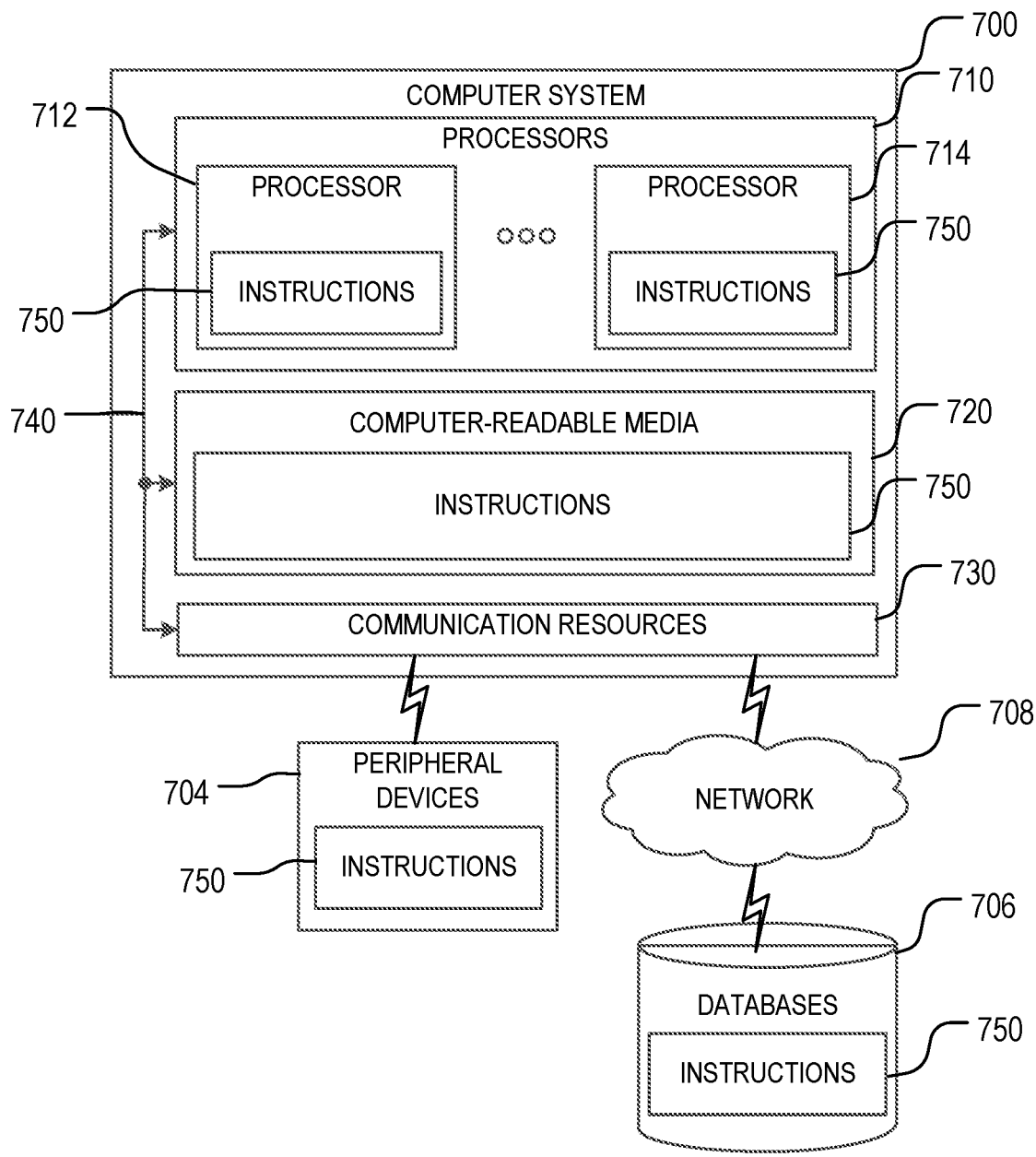
FIG. 7 illustrates a computer system, in accordance with various embodiments.

FIG. 7 is a block diagram illustrating components, according to some example embodiments, able to read instructions from a machine-readable or computer-readable medium (e.g., a machine-readable storage medium) and perform any one or more of the methodologies discussed herein. Specifically, FIG. 7 shows a diagrammatic representation of computer system 700 including one or more processors (or processor cores) 710, one or more computer-readable media 720, and one or more communication resources 730, each of which are communicatively coupled via one or more interconnects 730.

The processors 710 may include one or more central processing unit ("CPUs"), reduced instruction set computing ("RISC") processors, complex instruction set computing ("CISC") processors, graphics processing units ("GPUs"), digital signal processors ("DSPs") implemented as a baseband processor, for example, application specific integrated circuits ("ASICs"), radio-frequency integrated circuits (RFICs), etc. As shown, the processors 710 may include, a processor 712 and a processor 714.

The computer-readable media 720 may be suitable for use to store instructions 750 that cause the computer system 700, in response to execution of the instructions 750 by one or more of the processors 710, to practice selected aspects of the present disclosure described with respect to the UE, an eNB, and/or a location server. In some embodiments, the computer-readable media 720 may be non-transitory. As shown, computer-readable storage medium 720 may include instructions 750. The instructions 750 may be programming instructions or computer program code configured to enable the computer system 700, which may be implemented as UE 1A01 or 1A02 of FIG. 1A, or UE 105 or 205 of FIGS. 1B and 2, in response to execution of the instructions 750, to implement (aspects of) any of the methods or elements described throughout this disclosure related to RSTD reporting. In some embodiments, programming instructions 750 may be disposed on computer-readable media 750 that is transitory in nature, such as signals.

Any combination of one or more computer-usable or computer-readable media may be utilized as the computer-readable media 720. The computer-readable media 720 may be, for example, but not limited to, an electronic, magnetic, optical, electromagnetic, infrared, or semiconductor system, apparatus, device, or propagation medium. More specific examples (a non-exhaustive list) of the computer-readable media would include the following: an electrical connection having one or more wires, a portable computer diskette, a hard disk, RAM, ROM, an erasable programmable read-only memory (for example, EPROM, EEPROM, or Flash memory), an optical fiber, a portable compact disc read-only memory (CD-ROM), an optical storage device, a transmission media such as those supporting the Internet or an intranet, or a magnetic storage device. Note that the computer-usable or computer-readable media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable media may be any medium that can contain, store, communicate, propagate, or transport the program for use by or in connection with the instruction execution system, apparatus, or device. The computer-usable media may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As shown in FIG. 7, instructions 750 may reside, completely or partially, within at least one of the processors 710 (e.g., within the processor's cache memory), the computer-readable media 720, or any suitable combination thereof. Furthermore, any portion of the instructions 750 may be transferred to the computer system 700 from any combination of the peripheral devices 704 and/or the databases 706. Accordingly, the memory of processors 710, the peripheral devices 706, and the databases 706 are additional examples of computer-readable media.

The communication resources 730 may include interconnection and/or network interface components or other suitable devices to communicate with one or more peripheral devices 704 and/or one or more databases 706 via a network 708. For example, the communication resources 730 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components. In some embodiments, the communication resources 730 may include a cellular modem to communicate over a cellular network, an Ethernet controller to communicate over an Ethernet network, etc.

In some embodiments, one or more components of computer system 700 may be included as a part of a UE (for example, UE 1A01 or 1A02 of FIG. 1A, or UE 105 or 205 of FIGS. 1B and 2) or an eNB (for example, eNB 110, 210*a*, 210*b*, 210*c*, and/or 210*d*). For example, processing circuitry 135, configuration circuitry 155, or baseband circuitry 604 or 999 (FIG. 9 below) may include processors 712, 714, computer-readable media 720, or communication resources 730 to facilitate operations described above with respect to the UE, eNB, or some other element such as the location server.

The present disclosure is described with reference to flowchart illustrations or block diagrams of methods, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

Figure 8:
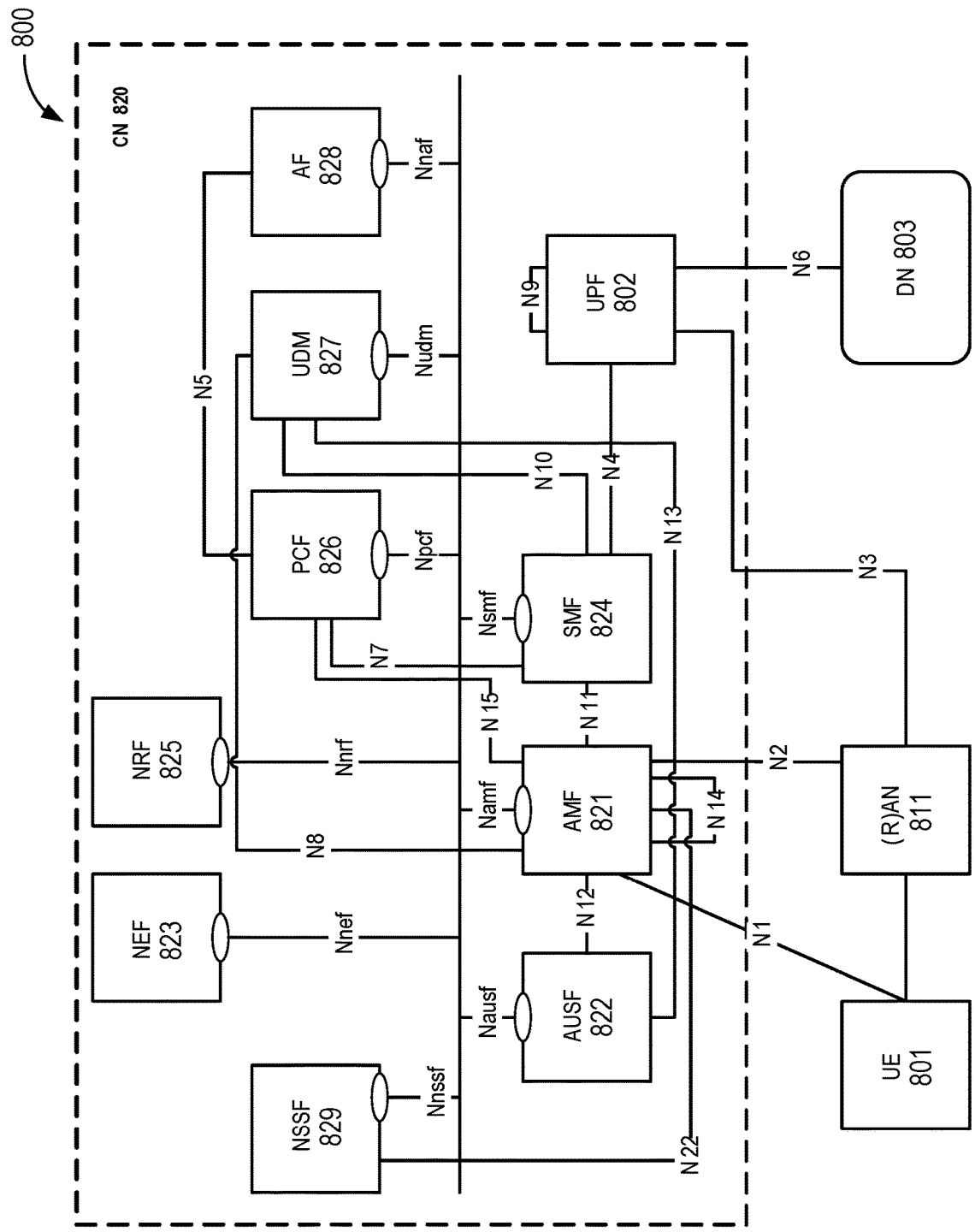
FIG. 8 illustrates an alternate electronic device, in accordance with various embodiments.

FIG. 8 illustrates an architecture of a system 800 of a network that may be used in accordance with some embodiments. The system 800 is shown to include a UE 801, which may be the same or similar to UEs 1A01, 105 or 205 discussed previously; a RAN node 811; a Data network (DN) 803, which may be, for example, operator services, Internet access or 3rd party services; and a 5G Core Network (5GC or CN) 820.

The CN 820 may include an Authentication Server Function (AUSF) 822; an Access and Mobility Management Function (AMF) 821; a Session Management Function (SMF) 824; a Network Exposure Function (NEF) 823; a Policy Control function (PCF) 826; a Network Function (NF) Repository Function (NRF) 825; a Unified Data Management (UDM) 827; an Application Function (AF) 828; a User Plane Function (UPF) 802; and a Network Slice Selection Function (NSSF) 829.

The UPF 802 may act as an anchor point for intra-RAT and inter-RAT mobility, an external PDU session point of interconnect to DN 803, and a branching point to support multi-homed PDU session. The UPF 802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 802 may include an uplink classifier to support routing traffic flows to a data network. The DN 803 may represent various network operator services, Internet access, or third party services. NY 803 may include, or be similar to application server 1A30 discussed previously. The UPF 802 may interact with the SMF 824 via an N4 reference point between the SMF 824 and the UPF 802.

The AUSF 822 may store data for authentication of UE 801 and handle authentication related functionality. The AUSF 822 may facilitate a common authentication framework for various access types. The AUSF 822 may communicate with the AMF 821 via an N12 reference point between the AMF 821 and the AUSF 822; and may communicate with the UDM 827 via an N13 reference point between the UDM 827 and the AUSF 822. Additionally, the AUSF 822 may exhibit an Nausf service-based interface.

The AMF 821 may be responsible for registration management (e.g., for registering UE 801, etc.), connection management, reachability management, mobility management, and lawful interception of AMF-related events, and access authentication and authorization. The AMF 821 may be a termination point for the an N11 reference point between the AMF 821 and the SMF 824. The AMF 821 may provide transport for Session Management (SM) messages between the UE 801 and the SMF 824, and act as a transparent proxy for routing SM messages. AMF 821 may also provide transport for short message service (SMS) messages between UE 801 and an SMS function (SMSF) (not shown by FIG. 8). AMF 821 may act as Security Anchor Function (SEA), which may include interaction with the AUSF 822 and the UE 801, receipt of an intermediate key that was established as a result of the UE 801 authentication process. Where USIM based authentication is used, the AMF 821 may retrieve the security material from the AUSF 822. AMF 821 may also include a Security Context Management (SCM) function, which receives a key from the SEA that it uses to derive access-network specific keys. Furthermore, AMF 821 may be a termination point of RAN CP interface, which may include or be an N2 reference point between the (R)AN 811 and the AMF 821; and the AMF 821 may be a termination point of NAS (N1) signaling, and perform NAS ciphering and integrity protection.

AMF 821 may also support NAS signaling with a UE 801 over an N3 interworking-function (IWF) interface. The N3IWF may be used to provide access to untrusted entities. N3IWF may be a termination point for the N2 interface between the (R)AN 811 and the AMF 821 for the control plane, and may be a termination point for the N3 reference point between the (R)AN 811 and the UPF 802 for the user plane. As such, the AMF 821 may handle N2 signaling from the SMF 824 and the AMF 821 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS signaling between the UE 801 and AMF 821 via an N1 reference point between the UE 801 and the AMF 821, and relay uplink and downlink user-plane packets between the UE 801 and UPF 802. The N3IWF also provides mechanisms for IPsec tunnel establishment with the UE 801. The AMF 821 may exhibit an Namf service-based interface, and may be a termination point for an N14 reference point between two AMFs 821 and an N17 reference point between the AMF 821 and a 5G-Equipment Identity Register (5G-EIR) (not shown by FIG. 8).

The SMF 824 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 824 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN. An N16 reference point between two SMFs 824 may be included in the system 800, which may be between another SMF 824 in a visited network and the SMF 824 in the home network in roaming scenarios. Additionally, the SMF 824 may exhibit the Nsmf service-based interface.

The NEF 823 may provide means for securely exposing the services and capabilities provided by 3GPP network functions for third party, internal exposure/re-exposure, Application Functions (e.g., AF 828), edge computing or fog computing systems, etc. In such embodiments, the NEF 823 may authenticate, authorize, and/or throttle the AFs. NEF 823 may also translate information exchanged with the AF 828 and information exchanged with internal network functions. For example, the NEF 823 may translate between an AF-Service-Identifier and an internal 5GC information. NEF 823 may also receive information from other network functions (NFs) based on exposed capabilities of other network functions. This information may be stored at the NEF 823 as structured data, or at a data storage NF using a standardized interfaces. The stored information can then be re-exposed by the NEF 823 to other NFs and AFs, and/or used for other purposes such as analytics. Additionally, the NEF 823 may exhibit an Nnef service-based interface.

The NRF 825 may support service discovery functions, receive NF Discovery Requests from NF instances, and provide the information of the discovered NF instances to the NF instances. NRF 825 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 825 may exhibit the Nnrf service-based interface.

The PCF 826 may provide policy rules to control plane function(s) to enforce them, and may also support unified policy framework to govern network behaviour. The PCF 826 may also implement a front end (FE) to access subscription information relevant for policy decisions in a UDR of the UDM 827. The PCF 826 may communicate with the AMF 821 via an N15 reference point between the PCF 826 and the AMF 821, which may include a PCF 826 in a visited network and the AMF 821 in case of roaming scenarios. The PCF 826 may communicate with the AF 828 via an N5 reference point between the PCF 826 and the AF 828; and with the SMF 824 via an N7 reference point between the PCF 826 and the SMF 824. The system 800 and/or CN 820 may also include an N24 reference point between the PCF 826 (in the home network) and a PCF 826 in a visited network. Additionally, the PCF 826 may exhibit an Npcf service-based interface.

The UDM 827 may handle subscription-related information to support the network entities' handling of communication sessions, and may store subscription data of UE 801. For example, subscription data may be communicated between the UDM 827 and the AMF 821 via an N8 reference point between the UDM 827 and the AMF 821 (not shown by FIG. 8). The UDM 827 may include two parts, an application FE and a User Data Repository (UDR) (the FE and UDR are not shown by FIG. 8). The UDR may store subscription data and policy data for the UDM 827 and the PCF 826, and/or structured data for exposure and application data (including Packet Flow Descriptions (PFDs) for application detection, application request information for multiple UEs 801) for the NEF 823. The Nudr service-based interface may be exhibited by the UDR 821 to allow the UDM 827, PCF 826, and NEF 823 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 824 via an N10 reference point between the UDM 827 and the SMF 824. UDM 827 may also support SMS management, wherein an SMS-FE implements the similar application logic as discussed previously. Additionally, the UDM 827 may exhibit the Nudm service-based interface.

The AF 828 may provide application influence on traffic routing, access to the Network Capability Exposure (NCE), and interact with the policy framework for policy control. The NCE may be a mechanism that allows the 5GC and AF 828 to provide information to each other via NEF 823, which may be used for edge computing implementations. In such implementations, the network operator and third party services may be hosted close to the UE 801 access point of attachment to achieve an efficient service delivery through the reduced end-to-end latency and load on the transport network. For edge computing implementations, the 5GC may select a UPF 802 close to the UE 801 and execute traffic steering from the UPF 802 to DN 803 via the N6 interface. This may be based on the UE subscription data, UE location, and information provided by the AF 828. In this way, the AF 828 may influence UPF (re)selection and traffic routing. Based on operator deployment, when AF 828 is considered to be a trusted entity, the network operator may permit AF 828 to interact directly with relevant NFs. Additionally, the AF 828 may exhibit an Naf service-based interface.

The NSSF 829 may select a set of network slice instances serving the UE 801. The NSSF 829 may also determine allowed Network Slice Selection Assistance Information (NSSAI) and the mapping to the Subscribed Single-NSSAIs (S-NSSAIs), if needed. The NSSF 829 may also determine the AMF set to be used to serve the UE 801, or a list of candidate AMF(s) 821 based on a suitable configuration and possibly by querying the NRF 825. The selection of a set of network slice instances for the UE 801 may be triggered by the AMF 821 with which the UE 801 is registered by interacting with the NSSF 829, which may lead to a change of AMF 821. The NSSF 829 may interact with the AMF 821 via an N22 reference point between AMF 821 and NSSF 829; and may communicate with another NSSF 829 in a visited network via an N31 reference point (not shown by FIG. 8). Additionally, the NSSF 829 may exhibit an Nnssf service-based interface.

As discussed previously, the CN 820 may include an SMSF, which may be responsible for SMS subscription checking and verification, and relaying SM messages to/from the UE 801 to/from other entities, such as an SMS-GMSC/IWMSC/SMS-router. The SMS may also interact with AMF 821 and UDM 827 for notification procedure that the UE 801 is available for SMS transfer (e.g., set a UE not reachable flag, and notifying UDM 827 when UE 801 is available for SMS).

The CN 820 may also include other elements that are not shown by FIG. 8, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 8). Individual NFs may share a UDSF for storing their respective unstructured data or individual NFs may each have their own UDSF located at or near the individual NFs. Additionally, the UDSF may exhibit an Nudsf service-based interface (not shown by FIG. 8). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 8 for clarity. In one example, the CN 820 may include an Nx interface, which is an inter-CN interface between the MME (e.g., MME 1A21) and the AMF 821 in order to enable interworking between CN 820 and CN 1A20. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

In yet another example, system 800 may include multiple RAN nodes 811 wherein an Xn interface is defined between two or more RAN nodes 811 (e.g., gNBs and the like) that connecting to 5GC 820, between a RAN node 811 (e.g., gNB) connecting to 5GC 820 and an eNB, and/or between two eNBs connecting to 5GC 820. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 801 in a connected mode (e.g., CM-CONNECTED) including functionality to manage the UE mobility for connected mode between one or more RAN nodes 811. The mobility support may include context transfer from an old (source) serving RAN node 811 to new (target) serving RAN node 811; and control of user plane tunnels between old (source) serving RAN node 811 to new (target) serving RAN node 811. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 9:
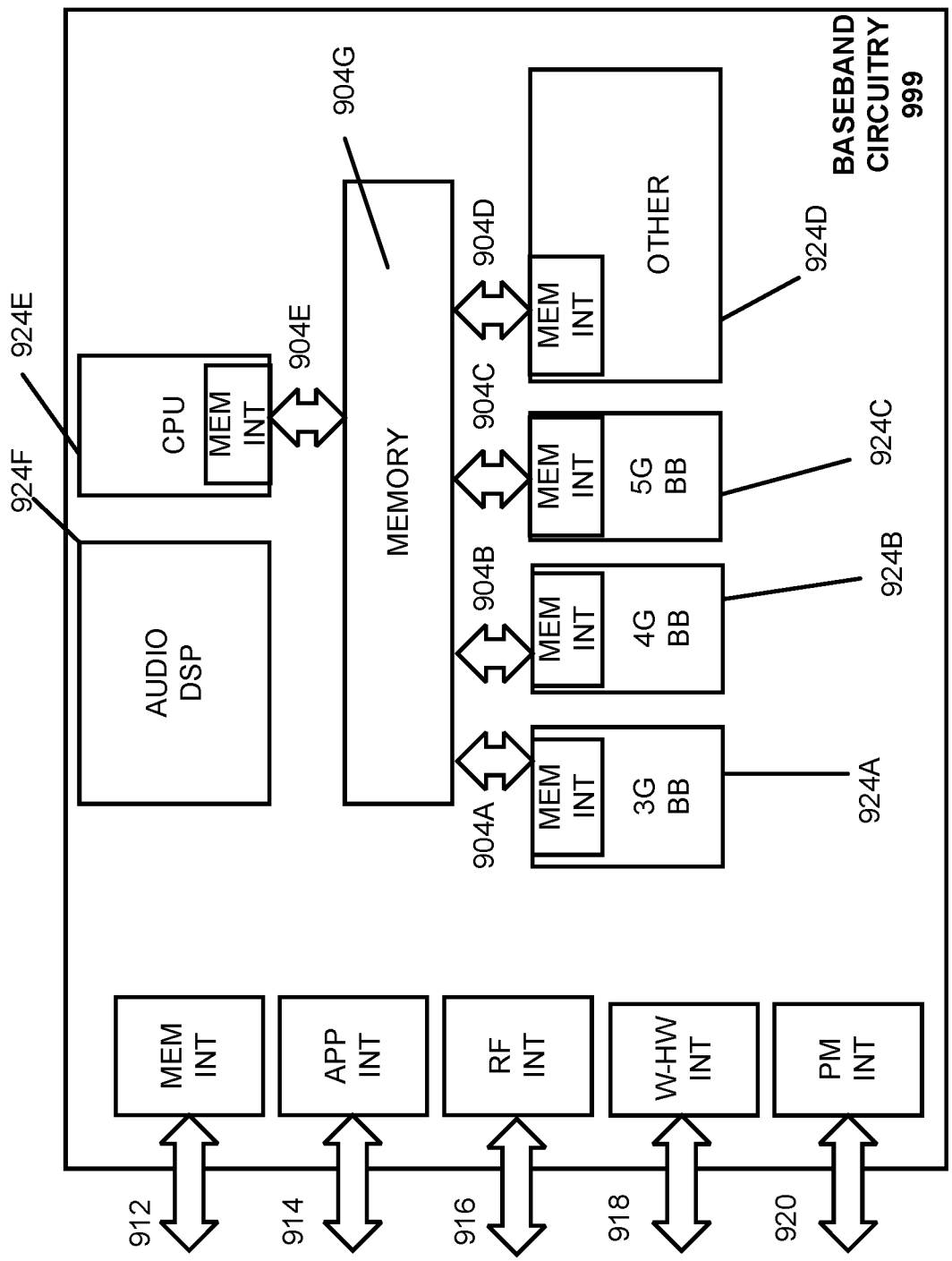
FIG. 9 depicts example interfaces of baseband circuitry in accordance with some embodiments.

FIG. 9 illustrates example interfaces of baseband circuitry 999 in accordance with some embodiments. Baseband circuitry 999 may be similar to, and substantially interchangeable with, baseband circuitry 604 with like-named components operating in similar manners unless otherwise noted. In this example, the baseband circuitry 999 may comprise processors 924A-924E and a memory 904G utilized by said processors. Each of the processors 924A-924E may include a memory interface, 904A-904E, respectively, to send/receive data to/from the memory 924G.

The baseband circuitry may further include Audio DSP 924F, as well as one or more interfaces to communicatively couple to other circuitries/devices, such as a memory interface 912 (e.g., an interface to send/receive data to/from memory external to the baseband circuitry 999), an application circuitry interface 914 (e.g., an interface to send/receive data to/from the application circuitry 1A05 of FIG. 1A), an RF circuitry interface 916 (e.g., an interface to send/receive data to/from RF circuitry), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMIC 1A25.

Some non-limiting examples are provided below.

EXAMPLES

Example 1 may include an apparatus to be used in a user equipment (UE) in a further enhanced narrowband Internet of Things (feNB-IoT) network to communicate with a base station, the apparatus comprising transceiver circuitry, and processing circuitry, coupled to the transceiver circuitry, to: process scheduling request (SR) configuration information received from the base station; and encode one or more SRs for transmission based on the SR configuration information.

Example 2 may include the apparatus of example 1, and/or any other example herein, wherein the processing circuitry is further to encode a scheduling request (SR) capability signal for transmission to the base station.

Example 3 may include the apparatus of example 1, and/or any other example herein, wherein the SR configuration information is to specify that the UE is only configured for SR when it is at one or more specified coverage levels.

Example 4 may include the apparatus of example 3, and/or any other example herein, wherein the or more specified coverage levels are based on at least one of: a Narrowband Physical Random Access Channel (NPRACH) coverage level or a number of Narrowband Physical Downlink Control Channel (NPDCCH) repetitions, or a maximum number of repetitions configured for NPDCCH in UE-specific search space.

Example 5 may include the apparatus of any one of examples 1-4, and/or any other example herein, wherein the processing circuitry is to further encode the one or more SRs for transmission, either: according to a dedicated Narrowband Physical Uplink Shared Channel/Narrowband Physical Uplink Control Channel (NPUSCH/NPUCCH) format, using a pre-defined sequence, or using NPUSCH format 2.

Example 6 may include the apparatus of example 5, and/or any other example herein, wherein the pre-defined sequence is a Zadoff-Chu sequence, whose root index, cyclic shift, and orthogonal cover code are either cell-specific or UE specific.

Example 7 may include the apparatus of example 5, and/or any other example herein, wherein the transceiver circuitry is to either: use a single-tone transmission for SR transmissions, wherein the sequence length is the same as a number of symbols used for SR transmission in a subframe or a 2 ms slot for 3.75 KHz subcarrier spacing; or use a multi-tone transmission for SR transmissions, wherein the sequence length equals a number of tones used per symbol.

Example 8 may include the apparatus of any one of examples 1-4, and/or any other example herein, wherein the SR configuration information is to further specify whether SR transmissions are to be single-tone or multi-tone.

Example 9 may include an apparatus to be used in a user equipment (UE) in a further enhanced narrowband Internet of Things (feNB-IoT) network, comprising: an input interface to receive scheduling request (SR) configuration information sent from a base station; an output interface; a buffer; and baseband circuitry coupled to the input and output interfaces and to the buffer to: process the SR configuration information to generate a SR; generate a Buffer Status Report (BSR) based, at least in part, on contents of the buffer; and cause a transmitter of the UE, via the output interface, to send the SR, followed by the BSR, to the base station.

Example 10 may include the apparatus of example 9, and/or any other example herein, wherein the baseband circuitry is further to cause the transmitter of the UE to send the BSR without the base station having first sent a UL grant for the BSR.

Example 11 may include the apparatus of example 9, and/or any other example herein, wherein the baseband circuitry causes the transmitter of the UE to send the BSR in NPUSCH format 1.

Example 12 may include the apparatus of example 9, and/or any other example herein, wherein the SR configuration information is to further specify that single-tone transmission is to use subcarrier spacing of 3.75 kHz or 15 kHz, and multi-tone transmission is to use subcarrier spacing of 15 kHz.

Example 13 may include the apparatus of example 9, and/or any other example herein, wherein the baseband circuitry is further to determine there is a HARQ-ACK feedback transmission also to be transmitted, and in response to the determination, to cause the transmitter of the UE, via the output interface, to either: drop one of SR or HARQ-ACK feedback; or multiplex SR and HARQ-ACK feedback.

Example 14 may include the apparatus of example 13, and/or any other example herein, wherein the baseband circuitry is further to cause the transmitter of the UE, via the output interface, to multiplex the SR and HARQ-ACK feedback, and, either: allocate different frequency domain resources to SR and HARQ-ACK feedback, or scramble symbols of the SR and HARQ-ACK feedback with different orthogonal sequences.

Example 15 may include the apparatus of example 13, and/or any other example herein, wherein the baseband circuitry is further to cause the transmitter of the UE, via the output interface, to multiplex the SR and HARQ-ACK feedback only when at least one of: SR and HARQ-ACK feedback collide, or neither SR nor HARQ-ACK feedback are configured with repetitions.

Example 16 may include the apparatus of example 9, and/or any other example herein, wherein the baseband circuitry is further to determine there is a pending Narrowband Physical Downlink Shared Channel (NPDSCH) message to be received by the UE, or a HARQ-ACK feedback transmission is to be transmitted by the UE, and in response to the determination, cause the transmitter of the UE, via the output interface, to append the SR to the HARQ-ACK feedback.

Example 17 may include one or more computer-readable media comprising instructions to cause a NB-IoT configured user equipment (UE) in a further enhanced narrowband Internet of Things (feNB-IoT) network, upon execution of the instructions by one or more processors of the UE, to: process scheduling request (SR) configuration information received from the base station; and encode one or more SRs for transmission based on the SR configuration information.

Example 18 may include the one or more computer-readable media of example 17, and/or any other example herein, further comprising instructions, that when executed, cause the UE to encode a SR capability signal for transmission to the base station.

Example 19 may include the one or more computer-readable media of either of claim 17 or 18, and/or any other example herein, wherein the SR configuration information is to specify that the UE is only configured for SR when it is at one or more specified NPRACH coverage levels.

Example 20 may include the one or more computer-readable media of example 19, and/or any other example herein, further comprising instructions, that when executed, cause the UE, to further encode the one or more SRs for transmission according to a dedicated Narrowband Physical Uplink Shared Channel/Narrowband Physical Uplink Control Channel (NPUSCH/NPUCCH format, using a pre-defined sequence.

Example 21 may include the one or more computer-readable media of example 20, and/or any other example herein, wherein the pre-defined sequence is a Zadoff-Chu sequence, whose root index, cyclic shift and orthogonal cover code are either cell-specific or UE specific.

Example 22 may include an apparatus for computing to transmit an SR to a base station in a further enhanced narrowband Internet of Things (feNB-IoT) network, comprising: means to receive, from the base station, SR configuration information; means to implement the SR configuration information; and means to encode one or more SRs for transmission to the base station based on the SR configuration information.

Example 23 may include the apparatus for computing of example 22, and/or any other example herein, further comprising at least one of: further comprising: means to determine whether a HARQ-ACK feedback transmission is pending; or means to drop one of the SR or the HARQ-ACK feedback; or means to multiplex the SR and the HARQ-ACK feedback and means to transmit the multiplexed signals to the base station.

Example 24 may include the apparatus for computing of example 23, and/or any other example herein, wherein the means to multiplex and the means to transmit are further to transmit the multiplexed signals to the base station only when at least one of: the SR and the HARQ-ACK feedback collide, or neither the SR nor the HARQ-ACK feedback are configured with repetitions.

Example 25 may include the apparatus for computing of example 22, and/or any other example herein, further comprising: means to determine whether a HARQ-ACK feedback transmission is pending; and means to multiplex the SR and the HARQ-ACK feedback, the means to multiplex including either: means to allocate different frequency domain resources to each of the SR and the HARQ-ACK feedback, or means to scramble the SR and HARQ-ACK symbols with different orthogonal sequences.

Example 26 may include a method performed by a NB-IoT configured user equipment (UE) in a further enhanced narrowband Internet of Things (feNB-IoT) network to communicate with a base station, comprising:
processing scheduling request (SR) configuration information received from a base station; and
encoding one or more SRs for transmission based on the SR configuration information.

Example 27 may include the method of example 26, and/or any other example herein, further comprising encoding for transmission to the base station, by the UE, an SR capability signal.

Example 28 may include the method of either of examples 26 or 27, and/or any other example herein, wherein the SR configuration information is to specify that the UE is only configured for SR when it is at one or more specified Narrowband Physical Random Access Channel (NPRACH) coverage levels.

Example 29 may include the method of example 28, and/or any other example herein, further comprising encoding for transmission, by the UE, the one or more SRs according to a dedicated Narrowband Physical Uplink Shared Channel/Narrowband Physical Uplink Control Channel (NPUSCH/NPUCCH) format, using a pre-defined sequence.

Example 30 may include the method of example 29, and/or any other example herein, wherein the pre-defined sequence is a Zadoff-Chu sequence, whose root index, cyclic shift and orthogonal cover code are either cell-specific or UE specific.

Example 31 may include a method performed by a user equipment (UE) in a further enhanced narrowband Internet of Things (feNB-IoT) network, comprising:

receiving scheduling request (SR) configuration information sent from a base station;

processing the SR configuration information to generate a SR;

analyzing the contents of an uplink buffer;

generating a Buffer Status Report (BSR) based, at least in part, on contents of the buffer;

and sending the SR, followed by the BSR, to the base station.

Example 32 may include the method of example 31, and/or any other example herein, further comprising sending the BSR without the base station having first sent an uplink (UL) grant for the BSR.

Example 33 may include the method of example 31, and/or any other example herein, wherein the BSR is sent in NPUSCH format 1.

Example 34 may include the method of example 31, and/or any other example herein, wherein the SR configuration information is to further specify that single-tone transmission is to use subcarrier spacing of 3.75 kHz or 15 kHz, and multi-tone transmission is to use subcarrier spacing of 15 kHz.

Example 35 may include the method of example 31, and/or any other example herein, further comprising:

determining there is a HARQ-ACK feedback transmission also to be transmitted, and in response to the determination, either: dropping one of SR or HARQ-ACK feedback, or multiplexing SR and HARQ-ACK feedback.

Example 36 may include the method of example 35, and/or any other example herein, further comprising multiplexing the SR and HARQ-ACK feedback, and, either:

allocating different frequency domain resources to SR and HARQ-ACK feedback, or scrambling symbols of the SR and HARQ-ACK feedback with different orthogonal sequences.

Example 37 may include the apparatus of example 35, and/or any other example herein, further comprising multiplexing the SR and HARQ-ACK feedback only when at least one of: SR and HARQ-ACK feedback collide, or neither SR nor HARQ-ACK feedback are configured with repetitions.

Example 38 may include an apparatus, or a portion of an apparatus, to perform any of the methods of examples 26-37.

What is claimed is:

1. An apparatus to be used in a user equipment (UE) in a further enhanced narrowband Internet of Things (feNB-IoT) network to communicate with a base station, the apparatus comprising:

transceiver circuitry; and processing circuitry, coupled to the transceiver circuitry, configured to:

encode a scheduling request (SR) capability indicator for transmission to the base station to notify the base station that the UE is capable of processing a scheduling request;

process SR configuration information received from the base station, the SR configuration information defining a predefined bit sequence;

encode one or more SRs for transmission based on the SR configuration information; and transmit, using the transceiver circuitry, the predefined bit sequence at a configured SR resource to signal that the UE has an SR.

2. The apparatus of claim 1, wherein the SR capability indicator comprises an SRcapability signal for transmission to the base station.

3. The apparatus of claim 1, wherein the SR configuration information is configured to specify that the UE is only configured for SR when it is at one or more specified coverage levels.

4. The apparatus of claim 3, wherein the or more specified coverage levels are based on at least one of: a Narrowband Physical Random Access Channel (NPRACH) coverage level or a number of Narrowband Physical Downlink Control Channel (NPDCCH) repetitions, or a maximum number of repetitions configured for NPDCCH in UE-specific search space.

5. The apparatus of claim 1, wherein the processing circuitry is configured to further encode the one or more SRs for transmission, either:

according to a dedicated Narrowband Physical Uplink Shared Channel/Narrowband Physical Uplink Control Channel (NPUSCH/NPUCCH) format, using the predefined bit sequence, or using NPUSCH format 2.

6. The apparatus of claim 5, wherein the predefined bit sequence is a Zadoff-Chu sequence, whose root index, cyclic shift, and orthogonal cover code are either cell-specific or UE specific.

7. The apparatus of claim 5, wherein the transceiver circuitry is configured to either:

use single-tone transmission for SR transmissions, wherein a sequence length is the same as a number of symbols used for SR transmission in a subframe or a 2 ms slot for 3.75 KHz subcarrier spacing; or use multi-tone transmission for SR transmissions, wherein the sequence length equals a number of tones used per symbol.

8. The apparatus of claim 1, wherein the SR configuration information is configured to further specify whether SR transmissions are to be single-tone or multi-tone.

9. An apparatus to be used in a user equipment (UE) in afurther enhanced narrowband Internet of Things (feNB-IoT) network, comprising:

an input interface to receive scheduling request (SR) configuration information sent from a base station;

an output interface;

a buffer; and baseband circuitry, coupled to the input and output interfaces and to the buffer, configured to:

generate an SR capability indicator for transmission to the base station to notify the base station that the UE is capable of processing a scheduling request;

process the SR configuration information to generate an SR, the SR configuration information defining a predefined bit sequence;

generate a Buffer Status Report (BSR) based, at least in part, on contents of the buffer;

cause a transmitter of the UE, via the output interface, to send the SR capability indicator to the base station; and cause the transmitter, via the output interface, to send the SR including the predefined bit sequence at a configured SR resource, followed by the BSR, to the base station.

10. The apparatus of claim 9, wherein the baseband circuitry is further configured to cause the transmitter of the UE to send the BSR without the base station having first sent a UL grant for the BSR.

11. The apparatus of claim 9, wherein the baseband circuitry causes the transmitter of the UE to send the BSR in Narrowband Physical Uplink Shared Channel (NPUSCH) format 1.

12. The apparatus of claim 9, wherein the SR configuration information is configured to further specify that single-tone transmission is configured to use subcarrier spacing of 3.75 kHz or 15 kHz, and multi-tone transmission is configured to use subcarrier spacing of 15 kHz.

13. The apparatus of claim 9, wherein the baseband circuitry is further configured to determine there is a Hybrid Automatic Repeat Request Acknowledgement (HARQ-ACK) feedback transmission to be transmitted, and in response to the determination, to cause the transmitter of the UE, via the output interface, to either:
    drop one of the SR or the HARQ-ACK feedback transmission; or
    multiplex the SR and the HARQ-ACK feedback transmission.

14. The apparatus of claim 13, wherein the baseband circuitry is further configured to cause the transmitter of the UE, via the output interface, to multiplex the SR and the HARQ-ACK feedback transmission, and, either:
    allocate different frequency domain resources to the SR and the HARQ-ACK feedback transmission, or
    scramble symbols of the SR and the HARQ-ACK feedback transmission with different orthogonal sequences.

15. The apparatus of claim 13, wherein the baseband circuitry is further configured to cause the transmitter of the UE, via the output interface, to multiplex the SR and the HARQ-ACK feedback transmission only when at least one of:
    the SR and the HARQ-ACK feedback transmission collide, or
    neither the SR nor the HARQ-ACK feedback transmission are configured with repetitions.

16. The apparatus of claim 9, wherein the baseband circuitry is further configured to determine there is a pending Narrowband Physical Downlink Shared Channel (NPDSCH) message to be received by the UE, or a Hybrid Automatic Repeat Request Acknowledgement (HARQ-ACK) feedback transmission is to be transmitted by the UE, and in response to the determination, cause the transmitter of the UE, via the output interface, to append the SR to the HARQ-ACK feedback transmission.

17. One or more non-transitory, computer-readable media comprising instructions to cause a narrowband Internet of Things (NB-IoT) configured user equipment (UE) in a further enhanced narrowband Internet of Things (feNB-IoT) network, upon execution of the instructions by one or more processors of the UE, to:
    encode a scheduling request (SR) capability indicator for transmission to the base station to notify the base station that the UE is capable of processing a scheduling request;
    process SR configuration information received from the base station, the SR configuration information defining a predefined bit sequence;
    encode one or more SRs for transmission based on the SR configuration information; and
    transmit, using a transceiver, the predefined bit sequence at a configured SR resource to signal that the UE has an SR.

18. The one or more non-transitory, computer-readable media of claim 17, wherein the SR capability indicator comprises an SR capability signal for transmission to the base station.

19. The one or more non-transitory, computer-readable media of claim 17, wherein the SR configuration information is configured to specify that the UE is only configured for SR when it is at one or more specified Narrowband Physical Random Access Channel (NPRACH) coverage levels.

20. The one or more non-transitory, computer-readable media of claim 19, further comprising instructions, that when executed, cause the UE, to further encode the one or more SRs for transmission according to a dedicated Narrowband Physical Uplink Shared Channel/Narrowband Physical Uplink Control Channel (NPUSCH/NPUCCH) format, using the predefined bit sequence.

21. The one or more non-transitory, computer-readable media of claim 20, wherein the predefined bit sequence is a Zadoff-Chu sequence, whose root index, cyclic shift and orthogonal cover code are either cell-specific or UE specific.

22. An apparatus for computing to transmit a scheduling request (SR) to a base station in a further enhanced narrowband Internet of Things (feNB-IoT) network, comprising:
    means to encode an SR capability indicator for transmission to the base station to notify the base station that the apparatus is capable of processing a scheduling request;
    means to receive, from the base station, SR configuration information, the SR configuration information defining a predefined bit sequence;
    means to implement the SR configuration information;
    means to transmit the predefined bit sequence at a configured SR resource to signal that an SR is ready for transmission; and
    means to encode one or more SRs for transmission based on the SR configuration information.

23. The apparatus for computing of claim 22, further comprising:
    means to determine whether a Hybrid Automatic Repeat Request Acknowledgement (HARQ-ACK) feedback transmission is pending; or
    means to drop one of the SR or the HARQ-ACK feedback transmission; or
    means to multiplex the SR and the HARQ-ACK feedback transmission and means to transmit the multiplexed signals to the base station.

24. The apparatus for computing of claim 23, wherein the means to multiplex and the means to transmit are further configured to transmit the multiplexed signals to the base station only when at least one of:
    the SR and the HARQ-ACK feedback transmission collide, or
    neither the SR nor the HARQ-ACK feedback transmission are configured with repetitions.

25. The apparatus for computing of claim 22, further comprising:
    means to determine whether a Hybrid Automatic Repeat Request Acknowledgement (HARQ-ACK) feedback transmission is pending; and
    means to multiplex the SR and the HARQ-ACK feedback transmission,
    the means to multiplex including either:
        means to allocate different frequency domain resources to each of the SR and the HARQ-ACK feedback tranmission, or means to scramble the SR and HARQ-ACK symbols with different orthogonal sequences.

* * * * *

UNITED STATES PATENT AND TRADEMARK OFFICE
CERTIFICATE OF CORRECTION

PATENT NO. : 11,159,929 B2
APPLICATION NO. : 16/479188
DATED : October 26, 2021
INVENTOR(S) : Ye et al.

Page 1 of 1

It is certified that error appears in the above-identified patent and that said Letters Patent is hereby corrected as shown below:

In the Claims

Claim 2, Column 34, Line 7, "an SRcapability signal" should read --an SR capability signal--.

Claim 24, Column 36, Line 50, "means tomultiplex and" should read --mean to multiplex and--.

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*